(12) United States Patent
Stevenson et al.

(10) Patent No.: US 8,579,103 B2
(45) Date of Patent: Nov. 12, 2013

(54) SYSTEM AND METHOD FOR TRANSPORTING SOLID FEED IN A SOLID FEED PUMP

(75) Inventors: John Saunders Stevenson, Anaheim, CA (US); Derek Leslie Aldred, Granada Hills, CA (US); Jeffrey Allen Rader, Burbank, CA (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 13/252,044

(22) Filed: Oct. 3, 2011

(65) Prior Publication Data

US 2013/0081925 A1    Apr. 4, 2013

(51) Int. Cl.
*B65G 17/12* (2006.01)
*B65G 31/02* (2006.01)
*B65G 31/04* (2006.01)
*B65G 19/16* (2006.01)

(52) U.S. Cl.
CPC ............ *B65G 19/16* (2013.01); *B65G 17/12* (2013.01); *B65G 31/02* (2013.01); *B65G 31/04* (2013.01)
USPC ........... 198/716; 198/640; 198/642; 198/701; 198/705; 198/617; 406/99

(58) Field of Classification Search
USPC ......... 198/642, 640, 638, 716, 692, 693, 697, 198/699.1, 701, 703, 705, 707–708, 198/710–712; 415/5; 406/96, 99, 71
See application file for complete search history.

(56) References Cited

U.S. PATENT DOCUMENTS

| | | | | |
|---|---|---|---|---|
| 2,170,934 A * | 8/1939 | White | ......................... | 198/716 |
| 2,265,672 A * | 12/1941 | Redler | ......................... | 198/716 |
| 2,269,558 A * | 1/1942 | De Los Sinden | ............ | 198/533 |
| 2,279,862 A * | 4/1942 | De Los Sinden | ............ | 198/716 |
| 2,338,112 A * | 1/1944 | Hell | ............................. | 418/262 |
| 2,626,571 A * | 1/1953 | Hoeneeke | ..................... | 418/238 |
| 2,632,399 A * | 3/1953 | Hyre | ............................. | 418/137 |
| 3,592,393 A * | 7/1971 | Sinden | ......................... | 239/669 |
| 3,592,394 A * | 7/1971 | Sinden | ......................... | 239/669 |
| 3,869,041 A * | 3/1975 | Loveland | ..................... | 198/385 |
| 3,881,590 A * | 5/1975 | Hartmann | .................. | 198/626.4 |
| 4,067,666 A | 1/1978 | Richards | | |
| 4,384,659 A | 5/1983 | Richards | | |
| 4,988,239 A | 1/1991 | Firth | | |
| 5,051,041 A | 9/1991 | Firth | | |
| 5,115,906 A * | 5/1992 | Yamaguchi | ................... | 198/716 |
| 5,402,876 A | 4/1995 | Hay | | |
| 5,485,909 A | 1/1996 | Hay | | |
| 5,497,873 A | 3/1996 | Hay | | |
| 5,551,553 A | 9/1996 | Hay | | |

(Continued)

OTHER PUBLICATIONS

U.S. Appl. No. 13/052,000, filed Mar. 18, 2011, Stevenson et al.

*Primary Examiner* — Mark A Deuble
(74) *Attorney, Agent, or Firm* — Fletcher Yoder, P.C.

(57) ABSTRACT

A system includes a solid feed pump configured to transport a solid feedstock. The solid feed pump includes at least one passage for the transport of the solid feedstock. The solid feed pump also includes at least one movable wall configured to move along the passage. The solid feed pump further includes a retractable gripping element configured to extend from the at least one movable wall into the at least one passage to grip a portion of the solid feedstock. In addition, the retractable gripping element is configured to retract away from the at least one passage.

22 Claims, 10 Drawing Sheets

(56) References Cited

U.S. PATENT DOCUMENTS

| | | | |
|---|---|---|---|
| 6,142,290 A * | 11/2000 | Tagliaferri | 198/716 |
| 6,213,289 B1 | 4/2001 | Hay et al. | |
| 6,422,418 B1 * | 7/2002 | Collins et al. | 221/253 |
| 7,810,631 B2 * | 10/2010 | Kawakami | 198/623 |
| 8,439,185 B2 * | 5/2013 | Fitzsimmons | 198/626.1 |

* cited by examiner

FIG. 2

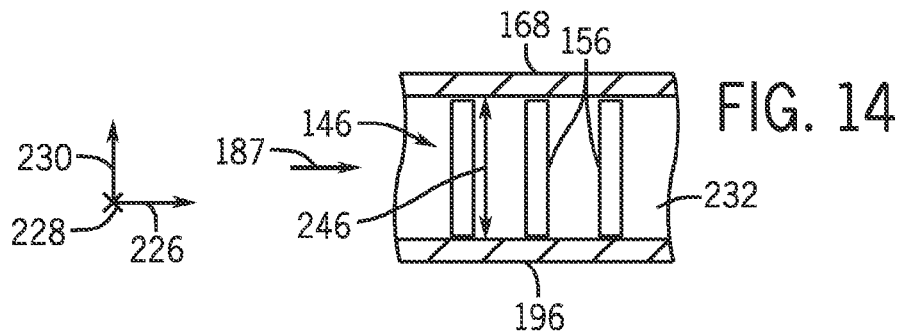
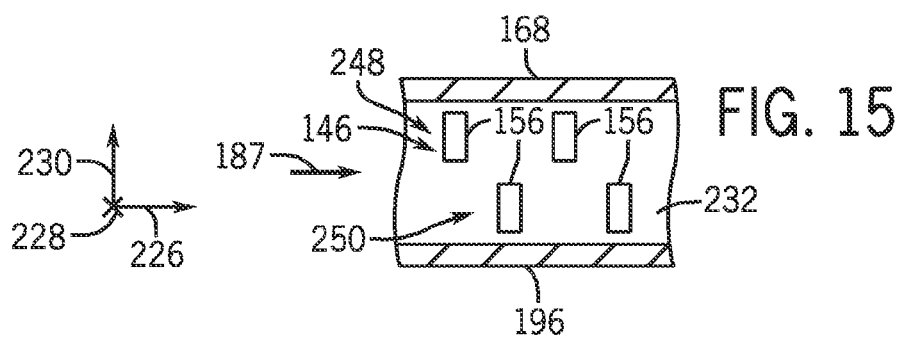
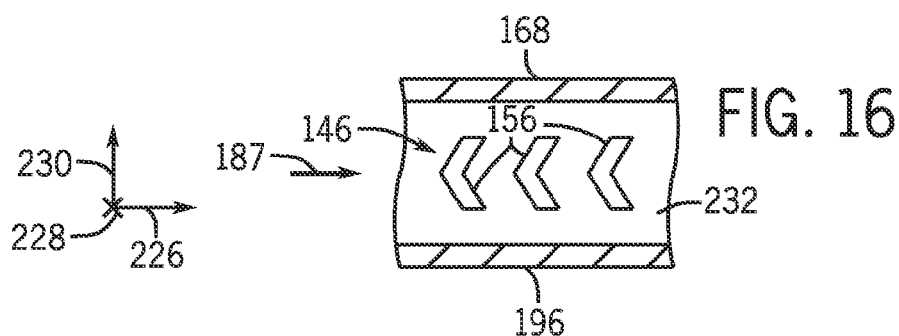
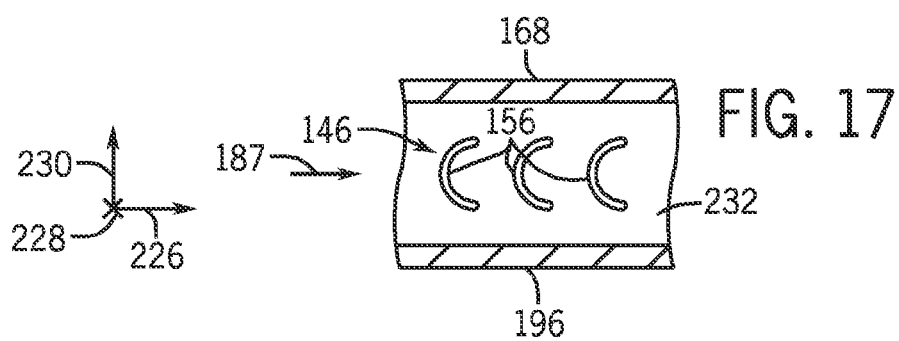
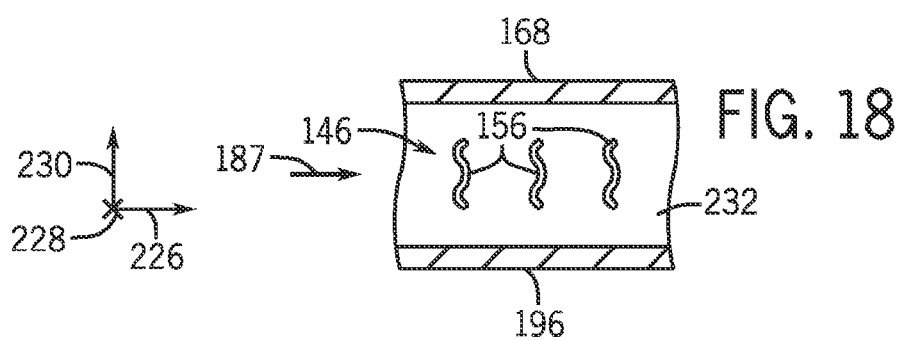

ically claimed invention are summarized below. These
SYSTEM AND METHOD FOR TRANSPORTING SOLID FEED IN A SOLID FEED PUMP

BACKGROUND OF THE INVENTION

The subject matter disclosed herein relates to a solid feed pump, and more specifically, to a system and method for transporting a solid feed in the solid feed pump.

A solid feed pump is used in a variety of industries to transport a solid feed, such as particulate matter. In general, the solid feed pump transports a solid feed along a moving path from an inlet to an outlet. The moving path may include features to lock-up the solid feed to facilitate this transport. Unfortunately, the features remain in place as the solid feed pump guides the solid feed from the outlet. As a result, the solid feed pump may demand greater power to unlock and output the solid feed. Furthermore, the solid feed pump may experience greater wear due to the lock-up of the solid feed by the features at the outlet.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a solid feed pump configured to transport a solid feedstock. The solid feed pump includes at least one passage for the transport of the solid feedstock. The solid feed pump also includes at least one movable wall configured to move along the passage. The solid feed pump further includes a retractable gripping element configured to extend from the at least one movable wall into the at least one passage to grip a portion of the solid feedstock. In addition, the retractable gripping element is configured to retract away from the at least one passage.

In accordance with a second embodiment, a system includes a solid feed pump configured to transport a solid feedstock. The solid feed pump includes a housing, a rotor disposed in the housing, wherein the rotor includes a first disc and a second disc coupled to a hub, and a passage disposed between the housing and the hub, the first disc, and the second disc of the rotor. The solid feed pump also includes multiple gripping elements configured to move between retracted positions and extended positions relative to a wall of at least one of the first disc, the second disc, or the hub. The multiple gripping elements extend into the passage in the extended positions to grip a portion of the solid feedstock, and the multiple gripping elements retract away from the passage in the refracted positions to release the portion of the solid feedstock.

In accordance with a third embodiment, a method includes extending multiple gripping elements into a passage of a solid feed pump from at least one wall moving along the passage to grip a portion of a solid feedstock between a solid feed inlet and a solid feed outlet. The method also includes retracting the multiple gripping elements from the passage into the at least one wall moving along the passage to release the gripped portion of the solid feedstock proximate the solid feed outlet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a schematic cross-sectional side view of an embodiment of a segmented solid feed pump with retractable gripping elements;

FIG. 14 is a schematic view of an embodiment of the passage and surrounding wall portions with a single wall portion having the retractable gripping elements (e.g., rectangular gripping elements spanning the single wall portion), taken along line 9-9 of FIGS. 3-8;

FIG. 15 is a schematic view of an embodiment of the passage and surrounding wall portions with a single wall portion having the retractable gripping elements (e.g., rectangular gripping elements in a staggered arrangement), taken along line 9-9 of FIGS. 3-8;

FIG. 16 is a schematic view of an embodiment of the passage and surrounding wall portions with a single wall portion having the retractable gripping elements (e.g., v-shaped gripping elements), taken along line 9-9 of FIGS. 3-8;

FIG. 17 is a schematic view of an embodiment of the passage and surrounding wall portions with a single wall portion having the retractable gripping elements (e.g., c-shaped gripping elements), taken along line 9-9 of FIGS. 3-8;

FIG. 18 is a schematic view of an embodiment of the passage and surrounding wall portions with a single wall portion having the retractable gripping elements (e.g., wavy gripping elements), take along line 9-9 of FIGS. 3-8;

DETAILED DESCRIPTION OF THE INVENTION

Figure 1:
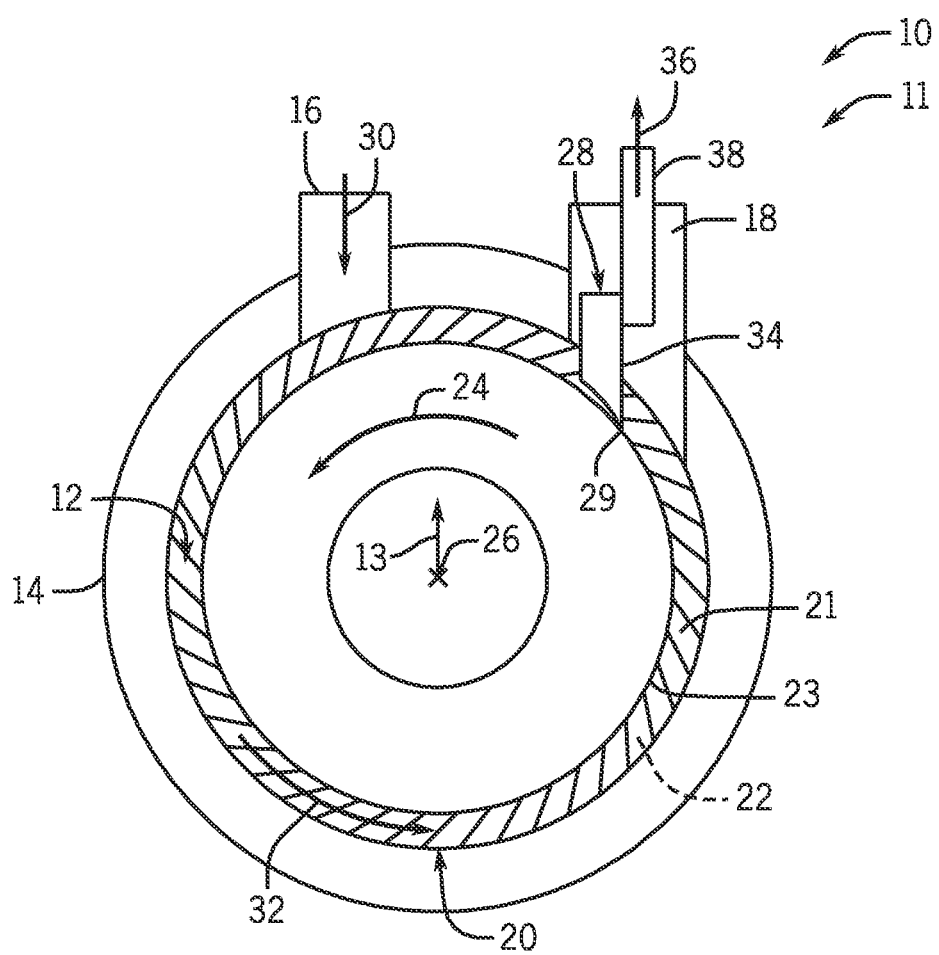
FIG. 1 is a schematic cross-sectional diagram of an embodiment of a solid feed pump with retractable gripping elements.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for redistributing solids within a solid feed pump, particularly, as the solids approach an outlet of the solid feed pump. In particular, the solid feed pump includes one or more gripping elements (e.g., retractable gripping elements) configured to grip and release the solids within a passage of the solid feed pump to redistribute the solids near the outlet to facilitate exiting of the solids through the outlet of the solid feed pump. For example, the one or more retractable gripping elements are configured to extend from at least one movable wall (e.g., disc or hub) into at least one passage to grip or displace a portion of the solids, and the one or more retractable gripping elements are configured to retract away from the at least one passage (e.g., to retract through at least one movable wall) to release the portion of the solids. As discussed in greater detail below, one or more gripping elements may extend from one or more movable walls crosswise to a flow direction of the solids in the at least one passage. In certain embodiments, the one or more gripping elements are configured to move between extended and retracted positions in a radial direction with respect to a rotational axis of the at least one movable wall and/or a direction substantially parallel with respect to the rotational axis. In some embodiments, the one or more gripping elements are configured to retract as the gripping elements approach the outlet (e.g., solid feed guide disposed within passage adjacent the outlet) and to move back into the passage after passing the outlet but prior to reaching an inlet of the solid feed pump. In certain embodiments, the one or more gripping elements are configured to move back into the passage after passing the outlet and after reaching an inner wall portion adjacent the inlet of the solid feed pump. The ability of the gripping elements to release the gripped or displaced portion of the solids prior to the outlet creates space within the solids to facilitate redistribution of the solids through the outlet. The redistribution of the solids may reduce the power requirements of the pump and reduce the wear and tear on the components of the pump (e.g., the outlet or solid feed guide).

FIG. 1 is a schematic diagram of an embodiment of a solid feed pump 10 having unique features to redistribute (e.g., grip and release) solid feedstock within a passage 12 of the solid feed pump 10. For example, one or more movable walls defining the passage 12 may include one or more gripping elements (e.g., retractable gripping elements) configured to extend from the one or more movable walls into the passage 12 to grip or displace a portion of the solid feedstock. In addition, the one or more gripping elements may retract away from the passage 12 through the one or more movable walls to release the release the gripped or displaced portion of the solid feedstock. The one or more gripping elements may move crosswise to a flow direction of the solid feedstock between an extended position and a retracted position relative to the passage 12. Indeed, the one or more gripping elements may move between the extended and retracted positions in a radial direction 13 with respect to a rotational axis 26 of the one or more movable walls and/or in a direction substantially parallel with respect to the rotational axis 26.

As to the solid feed pump 10, the pump 10 may be a Posimetric® pump made by General Electric Company of Schenectady, N.Y. The term "posimetric" may be defined as capable of metering (e.g., measuring an amount of) and positively displacing (e.g., trapping and forcing displacement of) a substance being delivered by the pump 10. The pump 10 is able to meter and positively displace a defined volume of a substance, such as a solid fuel feedstock (e.g., a carbonaceous feedstock). In particular, the solid feed pump is configured to transport a solid feedstock. The pump path may have an elliptical shape (e.g., circular or curved shape). The pump 10 may be used in any suitable application such as an integrated gasification combined cycle (IGCC) system, a gasification system, a solid fuel transport system, or any combination thereof. Other suitable applications include production of chemicals, fertilizers, substitute natural gas, transportation fuels, or hydrogen.

As shown in FIG. 1, the illustrated solid feed pump 11 includes a housing 14, inlet 16 (e.g., solid feed inlet), outlet 18 (e.g., solid feed outlet), and rotor 20. In certain embodiments, locations of the inlet 16 and the outlet 18 of the pump 11 may vary. The rotor 20 may include two substantially opposed and parallel rotary discs 21 and 22 coupled to a hub 23, which collectively define a movable wall with discrete cavities defined by retractable gripping elements as discussed in further detail below. The rotary discs 21 and 22 and hub 23 (e.g., annular-shaped movable wall portions) may be movable relative to the housing 14 in a rotational direction 24 from the inlet 16 towards the outlet 18 about a rotational axis 26. The rotary disc 21, the rotary disc 22, and/or the hub 23 (e.g., movable wall portions) may include one or more retractable gripping elements as described in greater detail below. The inlet 16 and the outlet 18 may be coupled to the continuous passage 12 (e.g., curved, circular, or annular passage). In certain embodiments, the pump 11 includes more than one passage 12 (e.g., 2-10 passages), where one or more movable walls of each passage 12 includes at least one retractable gripping element. In certain embodiments, the retractable gripping elements may extend and retract within the passage 12 about the entire rotational axis 26 (e.g., 360 degrees) of the pump 11. The passage 12 is disposed between the two rotary discs 21 and 22 and within the housing 14. A solid feed guide 28 (e.g., abutment) is disposed adjacent the outlet 18. The solid feed guide 28 may extend across the passage 12 between the rotary discs 21 and 22. The rotary discs 21 and 22 (e.g., movable walls) and the solid feed guide 28 interact to form sliding interfaces (not shown) as the discs 21 and 22 rotate in rotational direction 24. The hub 23 (e.g., movable wall) and the solid feed guide 28 interact to form a sliding interface 29 as the hub 23 rotates in the rotational direction 24. In particular, the hub 23 is configured to move along the sliding interface 29 with the solid feed guide 28.

As particulate matter is fed through an opening 30 of the inlet 16, the solid feed pump 11 may impart a tangential force or thrust to the particulate matter (e.g., solid fuel feedstock) in the rotational direction 24 of the rotor 20. The particulate matter is transported in direction 32 from the inlet 16 to the outlet 18. In addition, the particulate matter moves from low to high pressure before being discharged from the outlet 18 of the pump 11. During transport through the pump 11, the particulate matter locks-up, increases in pressure, and exits the pump 11 at a generally constant rate. As the particulate matter rotates through the passage 12, the particulate matter encounters a guide wall 34 of the solid feed guide 28 disposed adjacent the outlet 18 extending across the passage 12. The particulate matter is diverted by the solid feed guide 28 through an opening 36 of the outlet 18 into an exit pipe 38 connected to a high pressure vessel or into a conveyance pipe line. For example, the pipe 38 may deliver the particulate matter (e.g., solid fuel feedstock) to a gasifier, which then converts the feedstock into a synthesis gas or syngas.

The guide wall 34 of the solid feed guide 28 may substantially block the passage 12. As described in greater detail below, the one or more retractable gripping elements may be configured to retract away from the passage 12 as the elements approach the outlet 18. In addition, the one or more retractable gripping elements may be configured to retract away from the passage and the sliding interface 29 prior to reaching the solid feed guide 28. After passing the outlet 18 and the solid feed guide 28, the one or more retractable gripping elements are configured to move from one or more movable walls (e.g., rotary discs 21 or 22 or hub 23) into the passage 12 prior to reaching the inlet 16. The ability of the gripping elements to selectively grip or displace a portion of the solid feedstock facilitates the transport of the solid feedstock from the inlet 16 to the outlet 18, while the ability of the gripping elements to selectively release the portion of solid feedstock facilitates the discharge of the solid feedstock through the outlet 18. Thus, the space within the solid feedstock facilitates redistribution of the solid feedstock as the feedstock discharges from the outlet 18. In particular, the gripping elements selectively retract and unlock the solid feedstock near the outlet 18, thereby creating space and reducing the resistance to free the solid feedstock from the moving walls through the outlet 18. The redistribution of the solid feedstock prior to the outlet 18 lowers the power requirements of the pump 11. In addition, the redistribution of the solid feedstock due to the retractable gripping elements reduces the wear and tear on components of the pump 11 (e.g., the outlet 18 or the solid feed guide 28).

Figure 2:
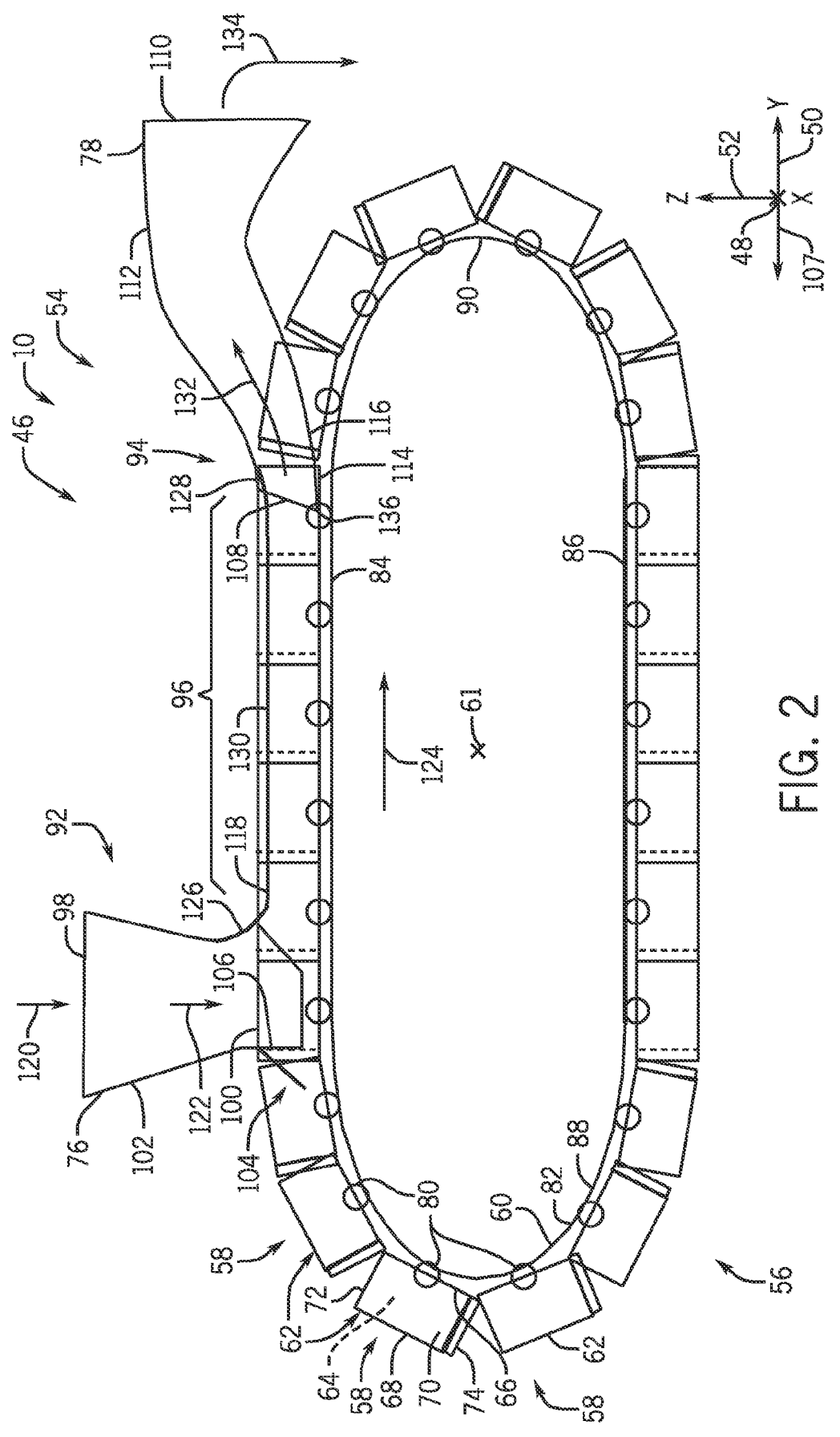

Alternative to a solid feed pump 10 having a continuous passage 12 (e.g., pump 11 in FIG. 1), the pump 10 may include a segmented solid feed pump 46 having one or more retractable gripping elements as described above in FIG. 1. FIG. 2 is a schematic side view of an embodiment of the segmented solid feed pump 46 oriented in a vertical arrangement. As indicated by the legend, cross 48 indicates a horizontal X-axis or direction out of the page, arrow 50 indicates a horizontal Y-axis or direction parallel to the page, and arrow 52 indicates a vertical Z-axis or direction parallel to the page. In the illustrated embodiment, the segmented solid feed pump 46 includes a material transport section 54 disposed along a portion of a segmented pump loop or carriage loop 56. As discussed in detail below, the material transport section 54 is generally fixed in position, while the carriage loop 56 moves relative to the material transport section 54. The loop 56 includes a plurality of pump segments 58 coupled together one after another in series about a closed-loop path 60, wherein the carriage loop 56 moves circumferentially along the path 60 about an axis 61. Each pump segment 58 includes a carriage 62 having a holding receptacle 64 (e.g., passage) defined by a bottom wall 66, an open top 68, opposite side walls 70, a front coupling 72, and a rear coupling 74. One or more movable walls 66 and 70 defining the receptacle 64 may include one or more gripping elements (e.g., retractable gripping elements) configured to selectively extend from the walls 66 and 70 into the receptacle 64 to grip or displace a portion of solid feedstock. In addition, the one or more gripping elements may retract away from the receptacle 64 through the one or more movable walls 66 and 70 to facilitate release of the gripped or displaced portion of the solid feedstock. The one or more gripping elements may move crosswise to a flow direction (e.g., direction 50) of the solid feedstock between an extended position and a retracted position relative to the receptacle 64. Indeed, the one or more gripping elements may move between the extended and refracted positions in a crosswise direction (e.g., perpendicular) with respect to the closed-loop path 60 of the one or more movable walls 66 and 70 and/or in a direction substantially parallel with respect to the axis of the closed-loop path 60.

In the illustrated embodiment, each pump segment 58 orients the open top 68 outwardly away from the closed-loop path 60. Each carriage 62 at least partially mates in an overlapping connection with adjacent carriages 62 on opposite front and rear sides in the transport section 54 of pump 46. For example, each carriage 62 has the front coupling 72 at least partially overlapping with the rear coupling 74 of a frontward carriage 62, while the carriage 62 has the rear coupling 74 at least partially overlapping with the front coupling 72 of a rearward carriage 62 facilitating the temporary joining or engagement of adjacent carriages 62 in transport section 54. In this manner, the carriages 62 are at least partially overlapping with adjacent carriages 62 about at least a portion of the closed-loop path 60. In addition, adjacent carriages 62 may at least partially overlap one another between an inlet duct 76 and an outlet duct 78 of the closed-loop path 60, while the adjacent carriages 62 may or may not overlap one another in other portions of the closed-loop path 60. In certain embodiments, the adjacent carriages 62 may interlock with one another along overlapping portions to define a substantially rigid channel between the inlet duct 76 and the outlet duct 78. In addition, each carriage 62 includes one or more track followers or wheels 80.

The illustrated closed-loop path 60 includes a track structure 82 engaged with the track followers or wheels 80 of each carriage 62. For example, embodiments of the track structure 82 may include a chain, a belt, a rail, or any suitable stationary or moveable structure. In one embodiment, the track followers or wheels 80 may be rotatable or pivotable linkages fixed to the track structure 82, while the track structure 82 moves along the closed-loop path 60. In another embodiment, the track structure 82 may be fixed along the closed-loop path 60, while the track followers or wheels 80 are driven to move along the closed-loop path 60. In still another embodiment, the track structure 82 may be a gear or belt drive system that may include elements such as guides and tensioners. The closed-loop path 60 may have a variety of shapes, such as a circular shape or a non-circular shape. In the illustrated embodiment, the closed-loop path 60 has a racetrack shape, which includes opposite straight path portions 84 and 86 disposed between opposite curved path portions 88 and 90. For example, the straight path portion 84 may extend along the transport section 54 between the inlet duct 76 and the outlet duct 78, wherein the straight path portion 84 may extend at least proximate to or slightly upstream of the inlet duct 76 and at least proximate to or slightly downstream of the outlet duct 78. In other embodiments, the closed-loop path 60 may be oval or substantially curved. For example, the portion 84 may be a curved path portion extending along the transport section 60 between the inlet duct 76 and the outlet duct 78. Furthermore, the curved path portion may have a substantially constant arc that extends at least proximate to or slightly upstream of the inlet duct 76 and at least proximate to or slightly downstream of the outlet duct 78.

In the illustrated embodiment, the segmented solid feed pump 46 is oriented in a vertical arrangement. In particular, the illustrated closed-loop path 60 may be oriented in a vertical plane relative to the vertical axis 52. In the illustrated vertical orientation of the carriage loop 56, the straight path portion 84 is an upper portion, while the straight path portion 86 is a lower portion vertically offset below the upper portion. Furthermore, the illustrated material transport section 54 is coupled to the upper straight path portion 84. The illustrated straight path portions 84 and 86 are generally parallel with one another, although other embodiments may orient the straight path portions 84 and 86 in a non-parallel arrangement. The opposite curved path portions 88 and 90 have opposite C-shapes, although other curved shapes may be employed in alternative embodiments. In the illustrated embodiment, the open top 68 of each carriage 62 faces upwardly along the upper portion 84, downwardly along the lower portion 86, leftwardly along the left curved path portion 88, and rightwardly along the right curved path portion 90.

The illustrated material transport section 54 includes an inlet or metering zone 92, an outlet or pressurization zone 94, and an intermediate metering and/or lock-up zone 96. In the illustrated embodiment, the inlet or metering zone 92 includes the inlet duct 76 having an inlet 98, an outlet 100, and a closed wall 102 between the inlet 98 and the outlet 100. The closed wall 102 may include an inner wall portion 104 and an outer wall portion 106, wherein the inner wall portion 104 extends into an interior of the carriages 62 while the outer wall portion 106 extends around an exterior of the carriages 62. For example, the inner wall portion 104 may extend to the bottom of the passing carriages 62 at an angle to guide flow of a substance into the carriages 62, while also blocking any back flow of the substance. As illustrated, the inner wall portion 104 extends back sufficiently far in direction 107 to enable the gripping elements into the passage 64 before the solid feedstock has fully entered the passage 64. It should be noted that the carriages 62 also must form a substantially rigid channel sufficiently upstream of inner wall portion 104 to contain the solid feedstock. In certain embodiments, the inner wall portion 104 may only extend partially towards the bottom of the passing carriages 62 to enable the gripping elements to extend at least partially into the passage 64 without colliding with the inner wall portion 104 while also extending sufficiently backward into passage 64 to limit the backward leakage of solids into the pump housing 14. In other embodiments, the inner wall portion 104 may include slots to enable the gripping elements to pass through the inner wall portion 104. Using the backward partial extension of inner wall 104 in combination with slots facilitates recovery of solids that leak past the slots into the carriages 62 as they approach inlet duct 76. The outlet or pressurization zone 94 includes an outlet duct 78 having an inlet 108, an outlet 110, and a closed wall 112 between the inlet 108 and the outlet 110. The closed wall 112 may include an inner wall portion 114 and an outer wall portion 116, wherein the inner wall portion 114 extends into an interior of the carriages 62 while the outer wall portion 116 extends around an exterior of the carriages 62. For example, the inner wall portion 114 may extend to the bottom of the passing carriages 62 at an angle to guide flow of a substance out of the carriages 62, e.g., gradually scoop up and deliver the substance through the outlet duct 78. The lock-up zone 96 includes a contoured guide plate or cover 118 extending between the closed wall 102 of the inlet duct 76 and the closed wall 112 of the outlet duct 78. For example, the cover 118 may extend over the open tops 68 of the carriages 62 moving between the outlet 100 of the inlet duct 76 and the inlet 108 of the outlet duct 78. In this manner, the cover 118 completely closes off the holding receptacle 64 of each carriage 62 passing between the inlet duct 76 and the outlet duct 78.

In certain embodiments, the material transport section 54 may be configured to transport, meter, and pressurize the substance (e.g., a solid feedstock) being handled by the segmented solid feed pump 46. For example, the inlet duct 76 of pump 46 may be configured to facilitate the ready or free flow of substance through inlet duct 76 into passing receptacles 64, such that pump 46 will not be starved of the substance. In certain embodiments, the flow of substance through inlet duct 76 may be mechanically assisted, such as by mechanical vibration, where care is taken to ensure the vibration does not interfere with achieving lockup in lockup zone 96. Furthermore, in certain embodiments, the flow of substance through inlet duct 76 may be pneumatically assisted, such as by a pneumatic system, where care is taken to ensure that the substance effectively flows into receptacles 64. Some embodiments also may employ other flow aiding elements to facilitate the flow of substance through the inlet duct 76. In the illustrated embodiment, the substance thus may flow into inlet duct 76 through the inlet 98 in an inlet direction 120, and then through the outlet 100 into a passing carriage 62 in an outlet direction 122. In the illustrated embodiment, the holding receptacle 64 of each carriage 62 has an equal and constant volume for metering purposes. Thus, a volume of pumped substance per unit of time can be easily calculated based on the number of carriages 62 passing by the outlet 100 of the inlet duct 76 per unit of time. Similarly, metering or control of the volume of substance pumped per unit of time may be affected by monitoring and adjusting the speed at which carriages 62 pass inlet 98. In certain embodiments, the speed may be controlled by a drive mechanism, such as a motor with speed control. Thus, the speed control can be used to increase or decrease the flow rate of substance being delivered by the pump 46. In another embodiment, one or more sensors may be disposed at one or more locations to track the number of carriage 62 passing by a portion of the pump 46 per unit of time. For example, the inlet or metering zone 92 may include one or more sensors to track the number of carriages 62 passing by the outlet 100 of the inlet duct 76 per unit of time. By further example, the sensors may be disposed at any location along the loop 60.

As illustrated, the inlet duct 76 delivers the substance to the passing carriages 62 in directions 120 and 122. For example, the inlet directions 120 and 122 may be parallel to the vertical axis 52 and perpendicular to a carriage direction 124 of the passing carriages 62 moving along the upper straight path portion 84. As the substance fills each holding receptacle 64, each carriage 62 moves from the inlet duct 76 toward the cover 118 of the lock-up zone 96. The cover 118 extends over the open top 68 of each carriage 62 between the inlet duct 76 and the outlet duct 78. Furthermore, the cover 118 may be shaped to provide a smooth transition between the outlet 100 of the inlet duct 76 and the cover 118, and between the cover 118 and the inlet 108 of the outlet duct 78, thereby minimizing the effect of the transitions on the movement of substance through solid feed pump 46. For instance, the illustrated cover 118 includes a curved entry section 126, a curved exit section 128, and an intermediate straight section 130 (e.g., parallel in downstream direction) relative to the straight path portion 84. In certain embodiments, the cover 118 may be adjustable to vary a volume between the cover 118 and the passing carriages 62. For example, the cover 118 may be moved toward or partially into the passing carriages 62 to decrease a carrying capacity of each carriage 62, thereby reducing the flow rate of the pump 46. Likewise, the cover 118 may be moved away from the passing carriages 62, while still maintaining a closed volume between the cover 118 and the carriages 62, to increase a carrying capacity of each carriage 62 and, thus, increase the flow rate of the pump 46. As illustrated, the passing carriages 62 transport the substance from the inlet duct 76 in the carriage direction 124 along the intermediate straight section 130 to the outlet duct 78, which then receives the substance through the inlet 108 in an inlet direction 132. The outlet duct 78 then routes the substance through the closed wall 112 and out through the outlet 110 in an outlet direction 134.

The curved entry section 126, curved exit section 128, and intermediate straight section 130 of the cover 118 are configured to control the flow of substance between the inlet and outlet ducts 76 and 78. The curved entry section 126 is configured to facilitate the flow of substance from inlet duct 76 into the moving carriages 62 in a somewhat converging manner, while the curved exit section 128 is configured to gradually guide the substance from the carriages 64 into the outlet duct 78 in a somewhat diverging manner. In certain embodiments, the inlet duct 76 and entry section 126 are configured to feed the substance into receptacles 64 in a somewhat diverging manner. Furthermore, in certain embodiments, the outlet duct 78 and exit section 128 may be configured to discharge the substance in a somewhat converging manner. In other embodiments, at least one of inlet duct 76 and entry section 126, and outlet duct 78 and exit section 128 are configured to create a flow path that is neither converging nor diverging. In some embodiments, inlet duct 76, entry section 126, outlet duct 78, and exit section 128 may be configured to be any shape that facilitates operation of pump 46 as described herein.

In the illustrated embodiment, the straight section 130 is parallel to the bottom wall 66 of each passing carriage 64 forming a duct of constant cross-sectional area with carriages 62 downstream of inlet duct 76 and upstream of outlet duct 78, wherein the bottom wall 66 and side walls 70 are moving and the top wall or cover 118 serves as a stationary guide surface. In certain embodiments, the cover 118 may be disposed directly along the open tops 68 of carriages 62. In certain other embodiments, the cover 118 may extend partially below the open top 68 of each carriage 62. In some embodiments, such as when pump 46 is used with certain compressible solids, the cover 118 may be shaped to somewhat converge relative to the bottom walls 66 of the carriages 62 along at least a portion of intermediate lockup zone 96. In other embodiments, the cover 118 may have any shape that facilitates the operation of pump 46 as provided herein.

Upon reaching the inlet 108 of the outlet duct 78, the substance in each passing carriage 62 is guided into and through the outlet duct 78. For instance, in the illustrated embodiment, the curved exit section 128 of the cover 118 extends at least partially into the inlet 108 of the outlet duct 78. In addition, the inlet 108 of the outlet duct 78 may be disposed directly along the bottom wall 66 of each passing carriage 62. For example, the inlet 108 of the outlet duct 78 may be angled upwardly in a downstream direction along the bottom wall 66 of the passing carriages 62, thereby scooping up or scraping up the substance in each holding receptacle 64 of the passing carriages 62. In particular, the bottom wall 66 of the passing carriages 62 and the inlet 108 interact to form a sliding interface 136. The bottom wall 66 of each of the passing carriages 62 is configured to move along the sliding interface 136 with the inlet 108 of the inlet 108 of the outlet duct 78. Furthermore, at least one upstream edge of inlet 108 of outlet duct 78 may be shaped to facilitate the pickup of substance from receptacles 64, including but not limited to incorporating one or more knife-like leading edges. Moreover, curved exit section 128 may be shaped to produce a diverging cross-section in cooperation with sliding interface 136 and opposite side walls 70 thereby facilitating the redistribution of the solids in the outlet 78.

The inlet 108 of the outlet duct 78 may divert the solid feedstock contained in receptacle 64, substantially removing the solids from each passing carriage 62. As described in greater detail below, one or more retractable gripping elements are configured to retract away from the receptacle 64 as the gripping elements approach the inlet 108 of the outlet duct 78. In addition, the one or more retractable gripping elements are configured to retract away from the receptacle 64 and the sliding interface 136 prior to reaching the inlet 108 of the outlet duct 78. After passing the outlet duct 78, the one or more retractable gripping elements are configured to move from one or more movable walls (e.g., bottom wall 68 or side walls 70) into the receptacle 64 after reaching the inner wall portion 104. Alternatively, in certain embodiments after passing duct 78, the retractable gripping elements may at least partially extend into receptacle 64 prior to reaching the inner duct 76. The ability of the gripping elements to selectively grip or displace a portion of the solid feedstock facilitates the transport of the solid feedstock from the inlet duct 76 to the outlet duct 78, while the ability of the gripping elements to selectively release the gripped or displaced portion of solid feedstock facilitates the discharge of the solid feedstock through the outlet duct 78. Thus, the space within the solid feedstock facilitates redistribution of the solid feedstock as the feedstock passes into and through the outlet duct 78. In particular, the gripping elements selectively retract and unlock the solid feedstock near the outlet duct 78, thereby creating space and reducing the resistance to free the solid feedstock from the moving walls to pass through the outlet duct 78. The redistribution of the solid feedstock prior to the outlet duct 78 lowers the power requirements of the pump 46. In addition, the redistribution of the solid feedstock due to the retraction of the gripping elements reduces the wear and tear on components of the pump 46 (e.g., the outlet duct 78).

Figure 3:
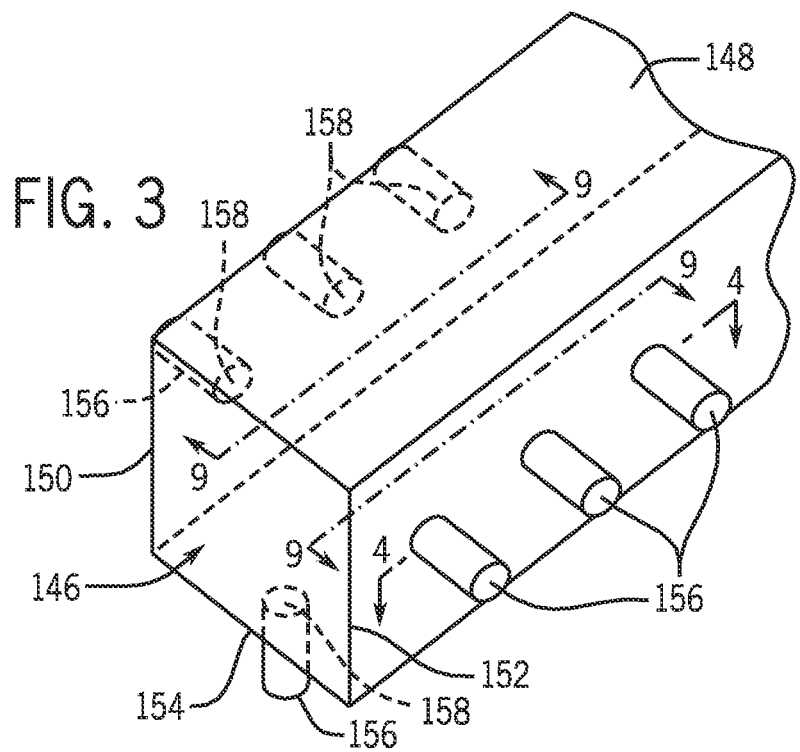
FIG. 3 is a partial schematic perspective view of an embodiment of a passage and surrounding wall portions of the solid feed pump, illustrating multiple walls with retractable gripping elements.

FIGS. 3-23 provide more details as to embodiments of the retractable gripping elements, which may be disposed in one or more walls of the pumps 10 (e.g., pumps 11 and 46 of FIGS. 1 and 2). FIG. 3 is a partial schematic perspective view of an embodiment of a passage 146 and surrounding wall portions 148, 150, 152, and 154 of the solid feed pump 10 with multiple wall portions 150, 152, 154 having retractable gripping elements 156. Though passage 146 is shown as being linear rather than arc-like in structure such as in the pump 46 of FIG. 2, it should be clear that the illustrated embodiment may be used to represent the comparable elements of the solid feed pump 11 of FIG. 1. Wall portions 148, 150, 152, and 154 define the passage 146. As mentioned above, the passage 146 is for the transport of solid feedstock within the solid feed pump 10. The passage 146 may include the passage 12 of the solid feed pump 11 of FIG. 1 with one or more continuous passages, or the passage 146 may include receptacle 64 of an individual carriage 62 of the segmented solid feed pump 46 of FIG. 2. For example, top wall portion 148 may represent the housing 14 (e.g., glide plane or glide surface) of the solid feed pump 11 of FIG. 1 or the cover 118 (e.g., glide plane or glide surface) of the segmented solid feed pump 46 of FIG. 2. The top wall portion 148 is not movable along the passage 146. Side wall portions 150 and 152 disposed may represent discs 21 and 22 of the solid feed pump 11 of FIG. 1 or side walls 70 of each carriage 62 of the segmented solid feed pump 46 of FIG. 2. Bottom wall portion 154 may represent the hub 23 of the solid feed pump 11 of FIG. 1 or the bottom wall 66 of each carriage 62 of the segmented solid feed pump 46 of FIG. 2. The wall portions 150, 152, and 154 are movable wall portions configured to move along the passage 146. As illustrated, the side wall portions 150 and 152 are disposed opposite from each other, and the bottom wall portion 154 is disposed crosswise to the side wall portions 150 and 152.

One or more wall portions 150, 152, and 154 may include one or more gripping elements 156 (e.g., retractable gripping elements). As illustrated, each movable wall portion 150, 152, and 154 includes a plurality of gripping elements 156. Each gripping element 156 is configured to move between a retracted position and an extended position relative to at least one of the wall portions 150, 152, and 154. For example, the one or more gripping elements 156 may move through openings 158 in one or more of the wall portions 150, 152, and 154. As illustrated, the gripping elements 156 are in retracted positions. In particular, the gripping element 156 is configured to extend from at least one movable wall portion 150, 152, and 154 into the passage 146 to grip or displace a portion of a solid feedstock. In addition, the gripping element 156 is configured to retract away from the passage 146. Indeed, the gripping element 156 is configured to retract through the at least one movable wall portion 150, 152, and 154 from the passage 146 to release the portion (e.g., gripped or displaced portion) of the solid feedstock. As mentioned above, the gripping (e.g., displacing) and releasing of the solid feedstock creates space to facilitate the redistribution solid feedstock within the passage 146, in particular, as the solid feedstock approaches the outlet 18 or outlet duct 78 of the solid feed pumps 11 and 46 of FIGS. 1 and 2. In certain embodiments, the gripping element 156 is configured to move crosswise to a flow direction of the solid feedstock between the extended position and the retracted position relative to the passage 146. In some embodiments, the gripping element 156 is configured to move between the extended and retracted positions in a radial direction with respect to a rotational axis of the at least one movable wall portion 150, 152, and 154. In other embodiments, the gripping element 156 is configured to move between the extended and retracted positions in a direction substantially parallel with respect to a rotational axis of the at least one movable wall portion 150, 152, and 154. In addition, the gripping element 156 may be configured to extend through a portion of the passage 146 or, alternatively, the entire passage 146. For example, the gripping element 156 may selectively extend across approximately 0 to 100, 0 to 50, 0 to 25, or 0 to 5 percent of the passage 146.

Figure 8:
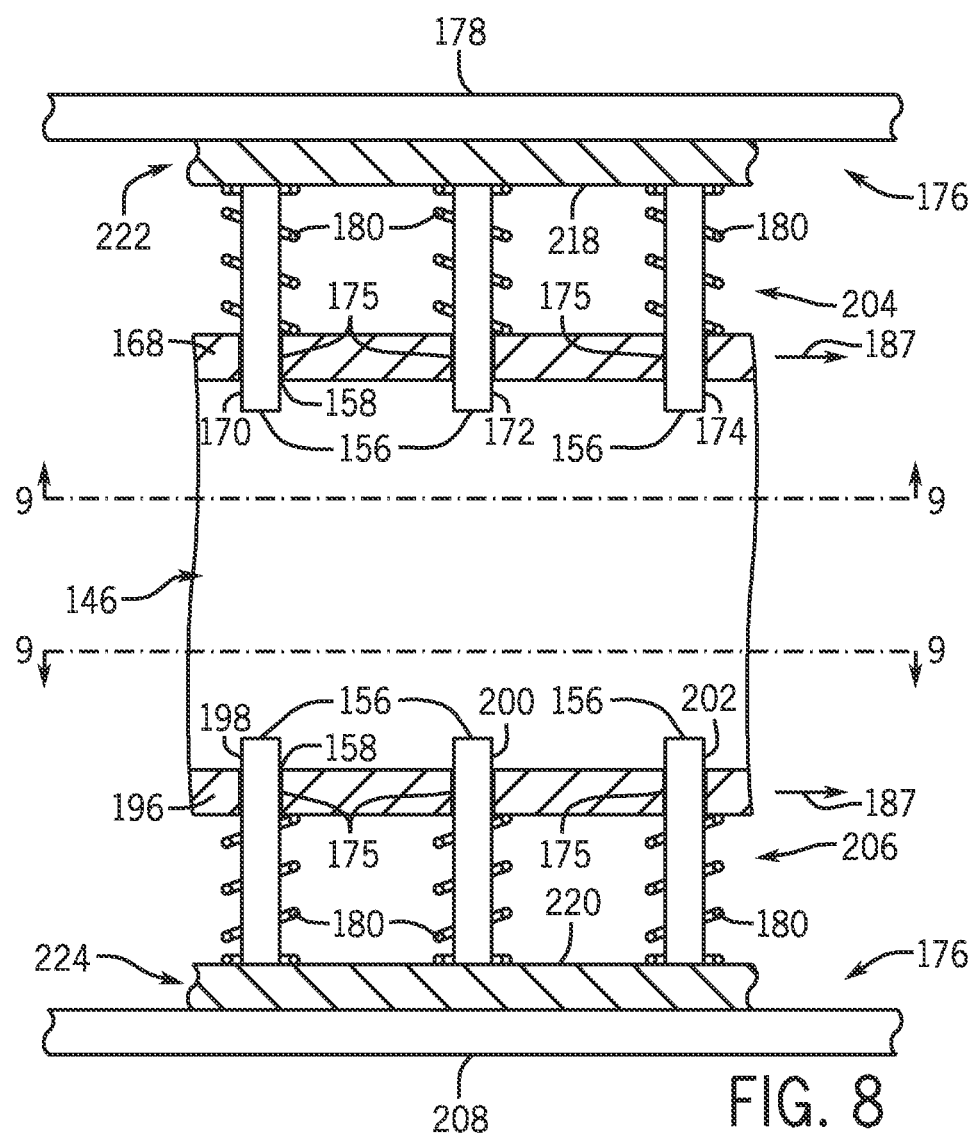
FIG. 8 is a schematic view of an embodiment of the passage and multiple surrounding wall portions, each having the retractable gripping elements.

Each gripping element 156 may be separate and configured to move between the extended and retracted positions independent of the other gripping elements 156. In certain embodiments, the gripping element 156 may include a plurality of gripping elements 156 (e.g., a single plate with multiple gripping elements 156 coupled together as illustrated in FIG. 8), where the plurality of gripping elements 156 are configured to move together between the extended and retracted positions. The types of the gripping elements 156 may also vary in embodiments. For example, the gripping elements 156 may include a rod, plate, fin, or a diaphragm (e.g., flexible diaphragm), or a combination thereof. The flexible diaphragms may be built into one or more wall portions 150, 152, and 154. The diaphragms may be hydraulically, pneumatically, or mechanically activated. Further, cross-sectional shapes of the gripping elements 156 may vary in embodiments. For example, the gripping elements 156 may include an elliptical shape (e.g., circle or oval), rectilinear shape (e.g., rectangle or square), triangle, diamond, curvilinear shape, arrow shape, or any other shape. In certain embodiments, the shapes (e.g., shapes incorporating an apex or tapered surface) of the gripping elements 156 ensure no undesired voids are created below a given gripping element 156. In certain embodiments, the types and cross-sectional shapes of the gripping elements 156 are the same on an individual wall portion 150, 152, and 154, and/or on multiple wall portions 150, 152, and 154. In some embodiments, the types and/or the cross-sectional shapes may vary between the gripping elements 156 on an individual wall portion 150, 152, and 154 and/or multiple wall portions 150, 152, and 154. Yet further, arrangements of the gripping elements 156 may vary on an individual wall portion 150, 152, and 154 and/or on multiple wall portions 150, 152, and 154. For example, the gripping elements 156 on an individual wall portion 150, 152, and 154 and/or between multiple wall portions 150, 152, and 154 may be offset, staggered, and/or aligned. The ability of the gripping elements 156 to selectively grip or displace a portion of the solid feedstock facilitates the transport of the solid feedstock from the inlet 16 or inlet duct 76 to the outlet 18 or outlet duct 78 (see FIGS. 1 and 2), while the ability of the gripping elements 156 to selectively release the portion of solid feedstock facilitates the discharge of the solid feedstock through the outlet 18 or outlet duct 78 (see FIGS. 1 and 2). The space within the solid feedstock facilitates redistribution of the solid feedstock as the feedstock approaches and passes through the outlet 18 or outlet duct 78. The redistribution of the solid feedstock prior the outlet 18 or the outlet duct 78 lowers the power requirements of the pump 10. In addition, the redistribution of the solid feedstock due to the retraction of the gripping elements 156 reduces the wear and tear on components of the pump 10 (e.g., the outlet 18, the outlet duct 78, or the solid feed guide 28).

Figure 24:
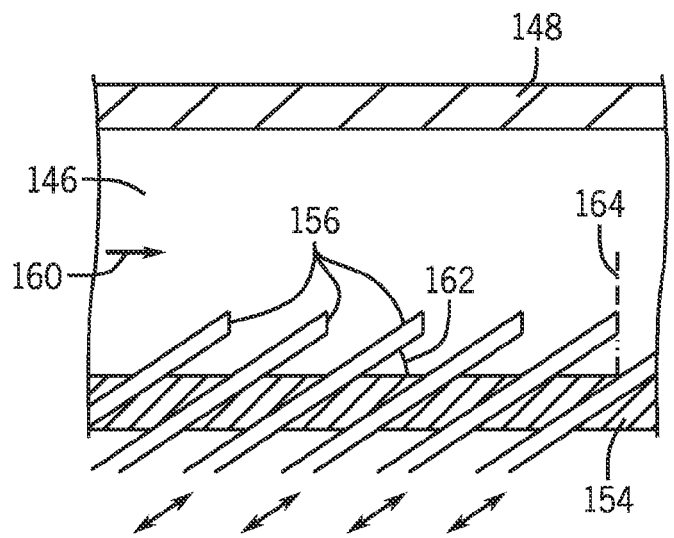
FIG. 24 is a schematic view of an embodiment of the passage and a surrounding wall portion of the solid feed pump with the retractable gripping elements, taken along line 4-4 of FIG. 3.

In some embodiments, the gripping elements 156 may be angled into a flow path 160 of the solid feedstock within the passage 146 (e.g., angled in a downstream direction of the flow path). For example, as illustrated in FIG. 24, the gripping elements 156 may be angled at an angle 162 other than normal to the passage 146. For example, the gripping elements 156 may be configured to move between the extended and retracted positions at the angle 162 with at least one of a radial direction and a direction substantially parallel with respect to the rotational axis of the at least one movable wall portion 154. The angle 162 may from approximately 0 to less than 90 degrees, 45 to less than 90 degrees, 65 to less than 90 degrees, 0 to 45 degrees, 25 to 40 degrees, and any other subrange therebetween. For example, the angle 160 may be approximately 5, 10, 15, 20, 25, 30, 35, 40, 45, 50, 55, 60, 65, 70, 75, 80, or 85 degrees, or other angle. Each angled gripping element 156 may extend into the flowpath 160 to a point, indicated by dashed line 164, where the adjacent angled gripping element 156 begins to extend from the at least one movable wall portion 154. The angled gripping elements 156, in conjunction with controlling the rate of retraction, may enable a uniform creation of void space and the redistribution of solid proximate the outlet. In other words, withdrawing the angled gripping elements 156 at controlled rates may eliminate discontinuities in the quantity of feed solids along the working portions of the passage 146.

Figure 4:
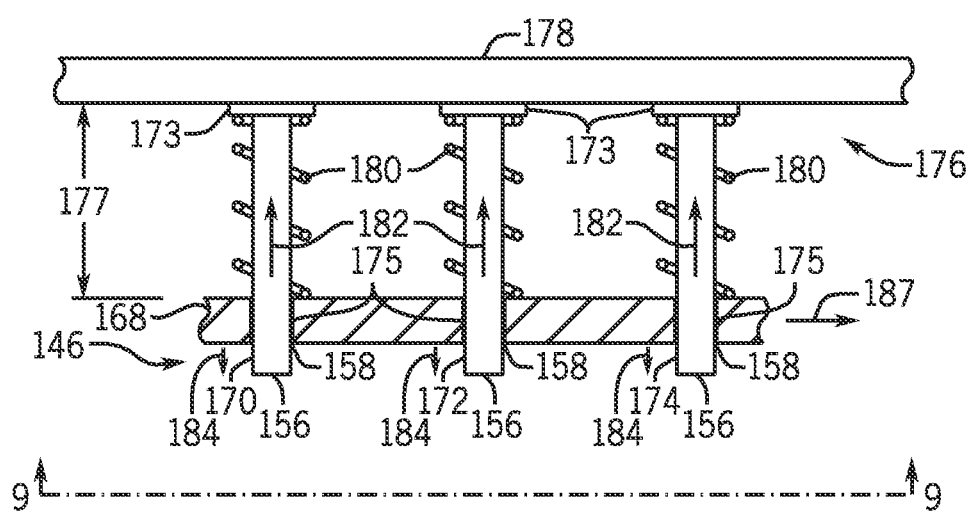
FIG. 4 is a schematic view of an embodiment of the passage and a surrounding wall portion of the solid feed pump with the retractable gripping elements, taken along line 4-4 of FIG. 3.
Figure 5:
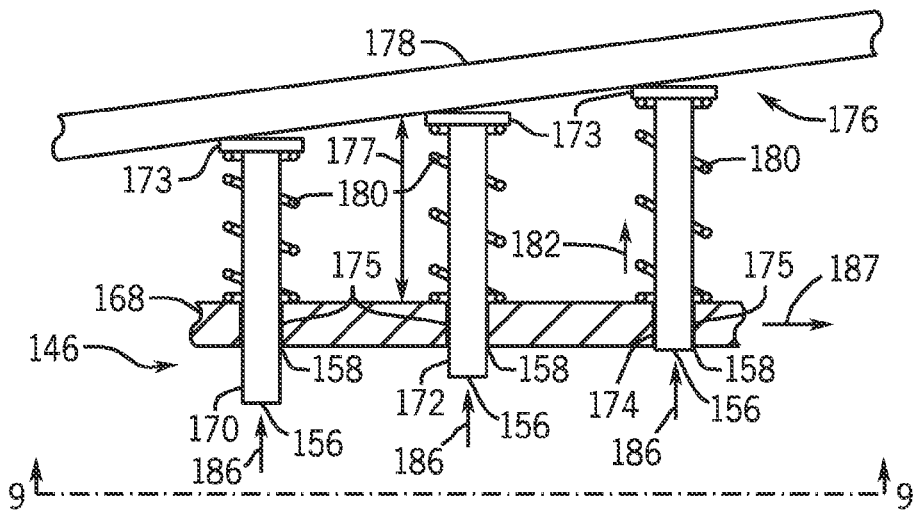
FIG. 5 is a schematic view of an embodiment of the passage and a surrounding wall portion of the solid feed pump with the retractable gripping elements, taken along line 4-4 of FIG. 3.

FIGS. 4 and 5 are schematic views of an embodiment of the passage 146 and a surrounding wall portion 168 of the solid feed pump 10 having the gripping elements 156, taken along line 4-4 of FIG. 3. Wall portion 168 may represent wall portion 150, 152, or 154 of FIG. 3. In addition, each gripping element 156 (e.g., 170, 172, and 174) may represent one or more gripping elements 156. Each gripping element 156 includes a head portion 173 and an extending portion 175. As described in greater detail below, the design or shape of the head portion 173 may vary. As illustrated, each gripping element 156 is associated via the head portion 173 to a mechanism 176 configured to move the gripping elements 156 between extended and retracted positions relative to the wall portion 168. In certain embodiments, the mechanism 176 may include a stationary wall that has variable distance 177 to the wall portion 168, wherein the gripping elements 156 slide along the stationary wall and extend and retract into the passage 146 depending on the variable distance, for example, as illustrated in FIG. 5. In some embodiments, the mechanism 176 may include a moveable element (e.g., chain or belts). In addition, the mechanism 176 may include a cam 178. The cam 178 may include a linear, curved, or grooved surface. In addition, each gripping element 156 includes a biasing element 180 (e.g., spring) to bias the gripping element 156 in a direction 182 away from the passage 146. The cam 178 is configured to counter the bias of the biasing element 180 by pushing the gripping elements 156 through the openings 158 into the passage 146. As illustrated in FIG. 4, the cam 178 is pushing each gripping element 156 (e.g., 170, 172, and 174) in direction 184 into extended positions within the passage 146. Furthermore, each gripping element 156 also may include a retaining and alignment element (both not shown) that fixes and aligns the gripping element 156 with wall portion 168, cam 178, or otherwise with mechanism 176. Moreover, in some embodiments, gas-tight or dust-tight seals (not shown) also may be used with the gripping elements. As illustrated in FIG. 5, the cam 178 gradually diverges from the wall portion 168 to enable the gradual retraction of the elements 156 in direction 186 (e.g., as the gripping elements 156 move in a direction 187 approaching the outlet 18 or outlet duct 78 of the solid feed pumps 10 and 46). For example, as illustrated, gripping element 170 is in a fully extended position within the passage 146, gripping element 172 is partially retracted from the passage 146 into the wall portion 168, and gripping element 174 is fully retracted from the passage 146 into the wall portion 168. Direction 187 also represents the direction of flow of solid feedstock. Thus, the gripping elements 156 are configured to move crosswise (e.g., direction 184 and 186) to the flow direction 187 of the solid feedstock between extended and retracted positions relative to the passage 146. The ability of the gripping elements 156 to move between the extended and retracted positions allows the elements to selectively grip or displace a portion of the solid feedstock to facilitate transport of the solid feedstock from the inlet 16 or inlet duct 76 to the outlet 18 or outlet duct 78 (see FIGS. 1 and 2), while the ability of the gripping elements 156 to selectively release the portion of the solid feedstock facilitates the discharge of the solid feedstock through the outlet 18 or outlet duct 78.

Figure 6:
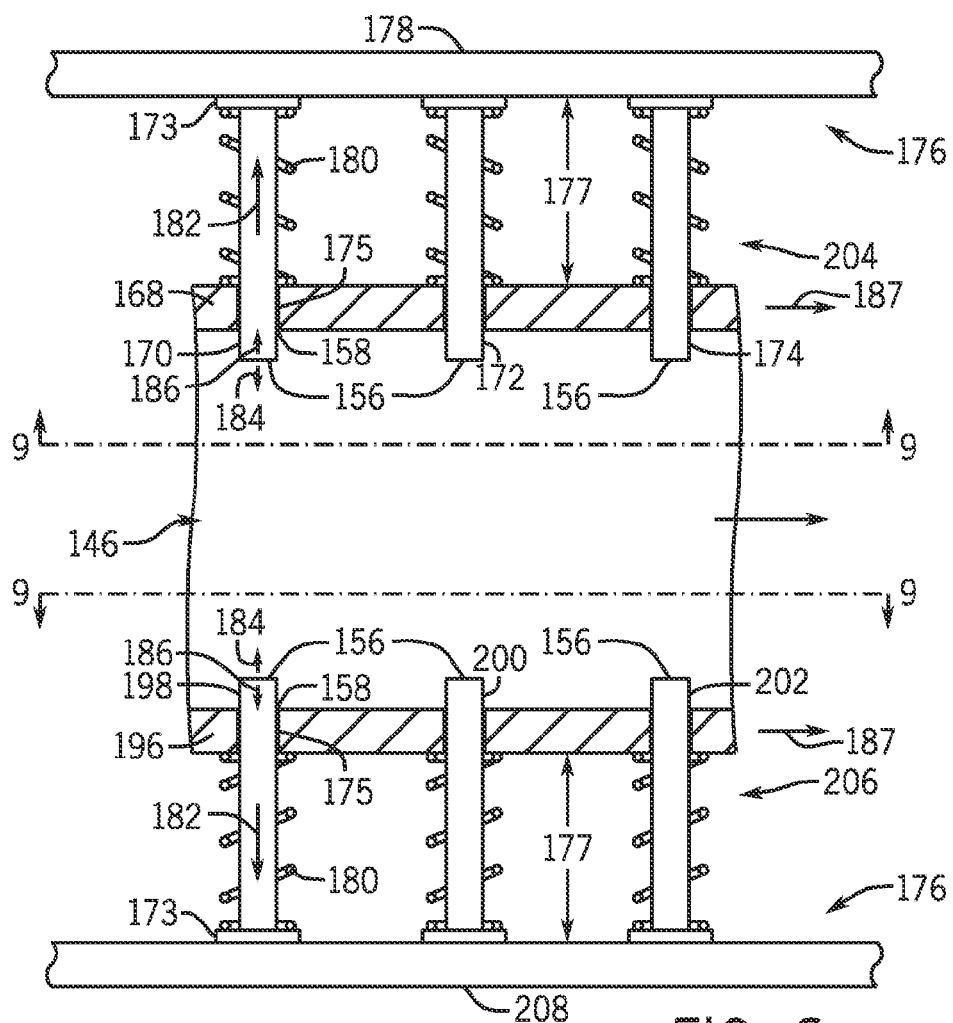
FIG. 6 is a schematic view of an embodiment of the passage and multiple surrounding wall portions, each having the retractable gripping elements.

FIG. 6 is a schematic view of an embodiment of the passage 146 and multiple surrounding wall portions 168 and 196 with each wall portion 168 and 196 having the retractable gripping elements 156. In certain embodiments, the wall portions 168 and 196 may represent the wall portions 150 and 152 of FIG. 3. In addition, each gripping element 156 (e.g., 170, 172, 174, 198, 200, and 202) may represent one or more gripping elements 156. In some embodiments, a first set 204 of gripping elements 156 may be associated with or slide along the mechanism 176 (e.g., cam 178), and a second set 206 of gripping elements 156 may be associated with or slide along the mechanism 176 (e.g., cam 208). For example, if the mechanism 176 moves with wall portions 168 and 196, then the gripping elements 156 may be coupled to mechanism 176. Alternatively, if the mechanism 176 is stationary, then the gripping elements 156 may slide along the mechanism 176. The gripping elements 156 and mechanism 176 are as described above in FIGS. 4 and 5. As illustrated, the first and second sets 204 and 206 of the gripping elements 156 are disposed directly opposite from one another. In other words, the gripping elements 156 align with each other relative to the direction of movement 187. In particular, the gripping elements 170, 172, and 174 are directly opposite the gripping elements 198, 200, and 202, respectively. In some embodiments, the gripping elements 156 may selectively extend approximately 0 to 50 percent across the passage 146 between wall portions 168 and 196. In certain embodiments, the retractable gripping elements 156 in the first and second sets 204 and 206 may directly contact or abut one another when fully extended into the passage 146. For example, the gripping elements 156 (e.g., 170 and 198), the gripping elements 156 (e.g., 172 and 200), and the gripping elements 156 (e.g., 174 and 202) may converge or diverge directly toward and away from one another between extended positions (i.e., in contact) within the passage 146 and retracted positions in the wall portions 168 and 196. In some embodiments, the gripping elements 156 do not align with one another, and thus may extend approximately 0 to 100 percent across the passage 146 between wall portions 168 and 196.

Figure 7:
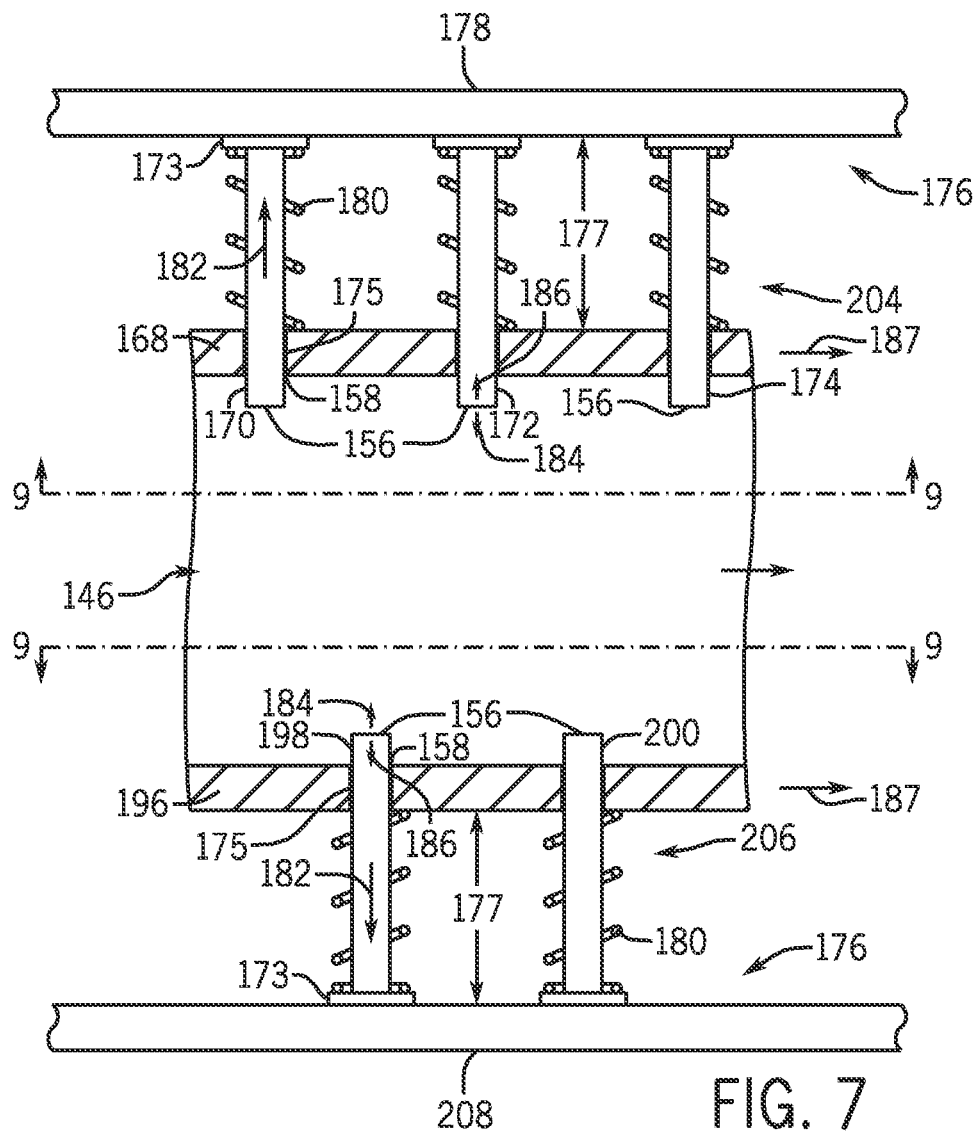
FIG. 7 is a schematic view of an embodiment of the passage and multiple surrounding wall portions, each wall having the retractable gripping elements.

FIG. 7 is a schematic view of an embodiment of the passage 146 with the multiple surrounding wall portions 168 and 196, each having the retractable gripping elements 156. FIG. 7 is as described in FIG. 6, except that the retractable gripping elements 156 are staggered relative to one another in the direction of movement 187. In particular, the first and second sets 204 and 206 of gripping elements 156 are offset (e.g., staggered) from each other in the direction of movement 187. For example, gripping element 198 on wall portion 196 is disposed between gripping elements 170 and 172 on wall portion 168. By further example, gripping element 200 on wall portion 196 is disposed between gripping elements 172 and 174 on wall position 168. In this staggered arrangement, each gripping element 156 (e.g., 170, 172, 174, 198, and 200) may extend approximately 0 to 100, 0 to 75, 0 to 50, 0 to 25 percent, or 0 to 5 percent across the passage 146 between wall positions 168 and 196.

As illustrated in FIGS. 6 and 7, each gripping element 156 may be separate and configured to move between the extended and retracted positions independent of the other gripping elements 156. Alternatively, as illustrated in FIG. 8, each gripping element 156 may include a plurality of gripping elements 156, which are configured to move together between extended and retracted positions. FIG. 8 is a schematic view of an embodiment of the passage 146 and the multiple surrounding wall portions 168 and 196, each having the retractable gripping elements 156. Each gripping element 156 (e.g., 170, 172, 174, 198, 200, and 202) may represent one or more gripping elements 156 (e.g., into the page). The extending portions 175 of the first and second sets 204 and 206 of gripping elements 156 are directly coupled to plates 218 and 220 to form multi-gripping element units 222 and 224, respectively. As illustrated, the plates 218 and 220 are located outside the wall portions 168 and 196 with the gripping elements 156 extending into the passage 146. In certain embodiments, the orientation of the multi-gripping element units 222 and 224 may be reversed with the plates 218 and 200 located within the passage 146. The plates 218 and 220 of the multi-gripping element units 222 and 224 are each associated with or slide along mechanisms 176 (e.g., cams 178 and 208). For example, if the mechanisms 176 are stationary, then the plates 218 and 220 may slide along mechanisms 176. Alternatively, if the mechanisms 176 move with wall portions 168 and 196, then the plates 218 and 220 may be coupled to mechanisms 176. The gripping elements 156 on each multi-gripping element unit 222 and 224 are configured to move together between extended and retracted positions. As illustrated, the individual gripping elements 156 of the multi-gripping element units 222 and 224 are disposed directly opposite from one another and align in the direction of movement 187. In particular, the gripping elements 170, 172, and 174 are directly opposite, and align with, the gripping elements 198, 200, and 202, respectively. In some embodiments, the gripping elements 156 may extend approximately 0 to 50 percent across the passage 146 between the wall portions 168 and 196. In certain embodiments, the gripping elements 156 of multi-gripping element unit 222 may directly contact or abut the gripping elements 156 of multi-gripping element unit 224 as the opposite gripping elements 156 converge and diverge toward one another. In some embodiments, the individual gripping elements 156 of each multi-gripping unit 222 and 224 do not align with one another, and thus may extend approximately 0 to 100 percent across the passage between wall portions 168 and 196.

Figure 9:
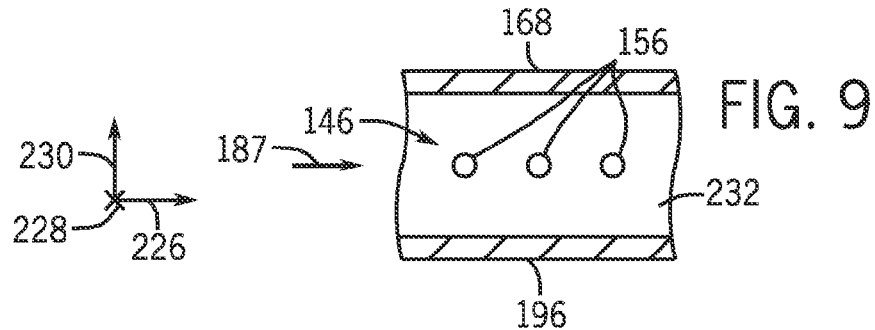
FIG. 9 is a schematic view of an embodiment of the passage and surrounding wall portions with a single wall portion having the gripping elements (e.g., aligned between opposite wall portions), taken along line 9-9 of FIGS. 3-8.
Figure 10:
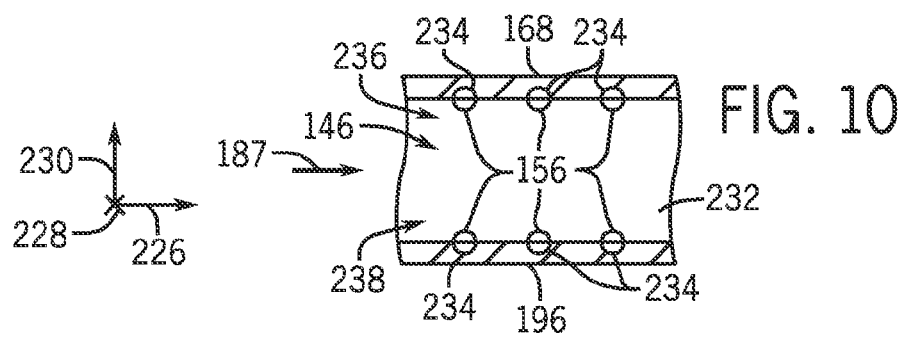
FIG. 10 is a schematic view of an embodiment of the passage and surrounding wall portions with multiple wall portions having the retractable gripping elements (e.g., along opposite wall portions), taken along line 9-9 of FIGS. 3-8.
Figure 11:
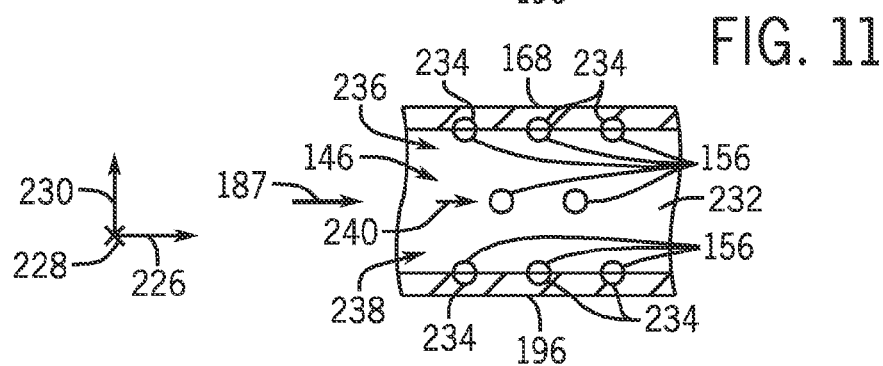
FIG. 11 is a schematic view of an embodiment of the passage and surrounding wall portions with multiple wall portions having the retractable gripping elements (e.g., along and between opposite wall portions), taken along line 9-9 of FIGS. 3-8.

FIGS. 9-18 illustrate various embodiments of arrangements and shapes of the gripping elements 156. In particular, FIGS. 9-18 are schematic views of embodiments of the passage 146 and surrounding wall portions 168, 196, and 232 with one or more wall portions 168, 196, and/or 232 including the gripping elements 156, taken along line 9-9 of FIGS. 3-8. For purposes of discussion, reference may be made to a lengthwise direction or axis 226, a first crosswise direction or axis 228, a second crosswise direction or axis 230. In context of the pump 11 of FIG. 1, the lengthwise direction 226 is a circumferential direction that extends around the rotational axis 26, the first crosswise direction 228 is a radial direction extending (e.g., out of the paper) away from the rotational axis 26, and the second crosswise direction 230 is an axial direction extending along (e.g., parallel to) the rotational axis 26. In context of the pump 46 of FIG. 2, the lengthwise direction 226 is a circumferential direction that extends along the closed-loop path 60, the first crosswise direction 228 is a radial direction extending (e.g., out of the paper) away from the axis 61 of the closed-loop path 60, and the second crosswise direction 230 is an axial direction extending along (e.g., parallel to) the axis 61 of the closed-loop path 60. In the embodiments of FIGS. 9 and 12-18, wall portions 168 and 196 may represent wall portions 148, 150, 152, or 154 of FIG. 3, and wall portion 232 may represent wall portions 150, 152, or 154 of FIG. 3. In the embodiments of FIGS. 10 and 11, wall portions 168, 196, and 232 represent wall portions 150, 152 and 154 of FIG. 3, respectively. In addition, in certain embodiments, each gripping element 156 may represent one or more gripping elements 156. As illustrated in FIGS. 9-18, a solid feedstock flows in the direction of movement 187 of the passage 146. In the embodiments, the gripping elements 156 are configured to move crosswise to the flow direction 187 of the solid feedstock (e.g., direction of movement 187 of passage 146) between extended and retracted positions relative to the passage 146. For example, the embodiments of the gripping elements 156 shown in FIGS. 9-18 are configured to move in the crosswise direction 228 between the extended and refracted positions. The embodiments below are not intended to be limiting, but rather the embodiments are intended to provide some examples of the various arrangements and shapes of the gripping elements 156 in the passage 146. In addition, the embodiments below may be combined in various arrangements.

Figure 12:
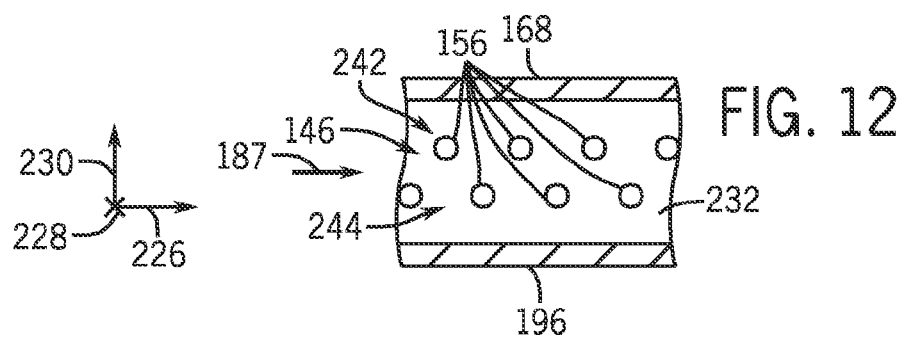
FIG. 12 is a schematic view of an embodiment of the passage and surrounding wall portions with a single wall portion having the retractable gripping elements (e.g., in a staggered arrangement), taken along line 9-9 of FIGS. 3-8.

The gripping elements 156 illustrated in FIGS. 9-12 may be diaphragms and/or rods. As illustrated in FIG. 9, the plurality of gripping elements 156 are aligned one after another in direction 187 along wall portion 232, which extends between wall portions 168 and 196. For example, the gripping elements 156 may be disposed approximately midway (e.g., centered) between the opposite wall portions 168 and 196. Each gripping element 156 includes an elliptical or circular cross-section. For example the gripping elements 156 may elliptical or cylindrical rods. As illustrated in FIG. 10, each wall portion 168 and 196 includes grooves 234. The grooves 234 are configured to enable the gripping elements 156 to extend and retract along the grooves 234 while partially recessed into the wall portion 168 or 196. As in FIG. 9, each gripping element 156 includes an elliptical cross-section. In the illustrated embodiment, the gripping elements 156 may be cylindrical rods, with a first semi-circular portion of the rod disposed in the groove 234 and a second semi-circular portion of the rod extending into the passage 146. The gripping elements 156 of FIG. 10 are aligned one after another in direction 187 along the periphery of wall portion 232 in a first set 236 of gripping elements 156 along wall portion 168 and in a second set 238 of gripping elements 156 along wall portion 196 in their respective grooves 234. Further, the first and second sets 236 and 238 of gripping elements 156 are directly opposite from one another in crosswise direction 230. FIG. 11 is as described in FIG. 10 except a third set 240 of gripping elements 156 are aligned one after another in direction 187, which extends between wall portions 168 and 196 along wall portion 232. As illustrated, the third set 240 of gripping elements 156 is offset (e.g., staggered) in the lengthwise direction 226 from the first and second sets 236 and 238 of gripping elements 156. As illustrated in FIG. 12, first and second sets 242 and 244 of gripping elements 156 are aligned one after in direction 187 along wall portion 232, which extends between wall portions 168 and 196. However, the first and second sets 242 and 244 of gripping elements 156 are offset (e.g., staggered) in the lengthwise direction 226 relative to one another.

Figure 13:
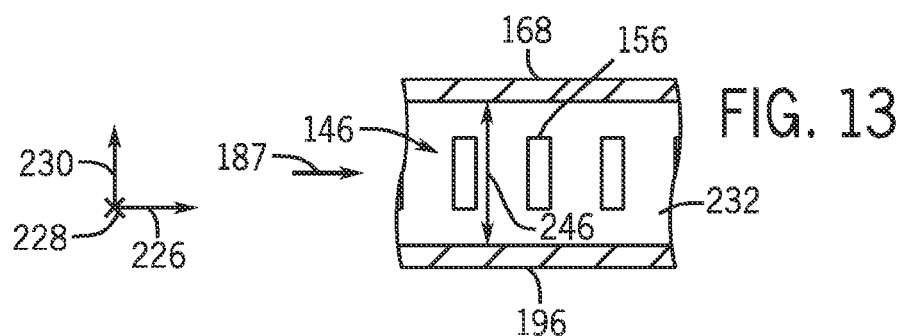
FIG. 13 is a schematic view of an embodiment of the passage and surrounding wall portions with a single wall portion having the retractable gripping elements (e.g., rectangular gripping elements spanning a portion of the single wall portion), taken along line 9-9 of FIGS. 3-8.

The gripping elements 156 illustrated in FIGS. 13-18 may be plates, fins, or any other form or construction that allows pump 10 to operate as set forth herein. As illustrated in FIG. 13, the plurality of gripping elements 156 are aligned one after another in direction 187 along wall portion 232, which extends between wall portions 168 and 196. Each gripping element 156 includes a rectilinear cross-section (e.g., rectangle or square). Each gripping element 156 extends in the crosswise direction 230 across only a portion of a dimension 246 (e.g., height or width) of the passage 146. FIG. 14 is as described in FIG. 13, except each gripping element 156 extends in the crosswise direction 230 across the entire dimension 246 (e.g., height or width) of the passage 146. In certain embodiments, each gripping element 156 may abut each other to form a continuum of gripping elements 156 (e.g., forming a retractable wall) without a gap. As illustrated in FIG. 15, the gripping elements 156 are aligned one after another in direction 187 along wall portion 232 in a first set 248 of gripping elements 156 and a second set 250 of gripping elements 156. The first and second sets 248 and 250 of gripping elements 156 are offset (e.g., staggered) in the lengthwise direction 226 relative to each other. Also, as in FIGS. 13 and 14, the gripping elements 156 of FIG. 15 include a rectilinear cross-section. However, the gripping elements 156 may have other shapes. As illustrated in FIG. 16, the gripping elements 156 are aligned one after another in direction 187 along wall portion 232, which extends between wall portions 168 and 196. Each gripping element 156 includes a wedge, v-shaped, or arrowhead-shaped cross-section. The v-shaped gripping elements 156 may help to hold and push the solid feedstock in the direction 187. As illustrated in FIG. 17, the gripping elements 156 are aligned one after another in direction 187 along wall portion 232, between wall portions 168 and 196. Each gripping element 156 includes a curved, or c-shaped, or concave cross-section (e.g., crescent). Again, these c-shaped gripping elements 156 may help to hold and push the solid feedstock in the direction 187. As illustrated in FIG. 18, the gripping elements 156 are aligned one after another in direction 187 along wall portion 232, which extends between wall portions 168 and 196. Each gripping element 156 includes a wavy or zigzagging cross-section. As mentioned above, the gripping elements 156 are configured to move crosswise to the flow direction 187 of the solid feedstock between extended and retracted positions relative to the passage 146. For example, the embodiments of the gripping elements 156 shown in FIGS. 9-18 are configured to move in the crosswise direction 228 between the extended and retracted positions. The ability of the gripping elements 156 to move between the extended and retracted positions allows the elements to selectively grip a portion of the solid feedstock to facilitate transport of the solid feedstock from the inlet 16 or inlet duct 76 to the outlet 18 or outlet duct 78 (see FIGS. 1 and 2), while the ability of the gripping elements 156 to selectively release the portion of the solid feedstock facilitates the discharge of the solid feedstock through the outlet 18 or outlet duct 78.

Figure 19:
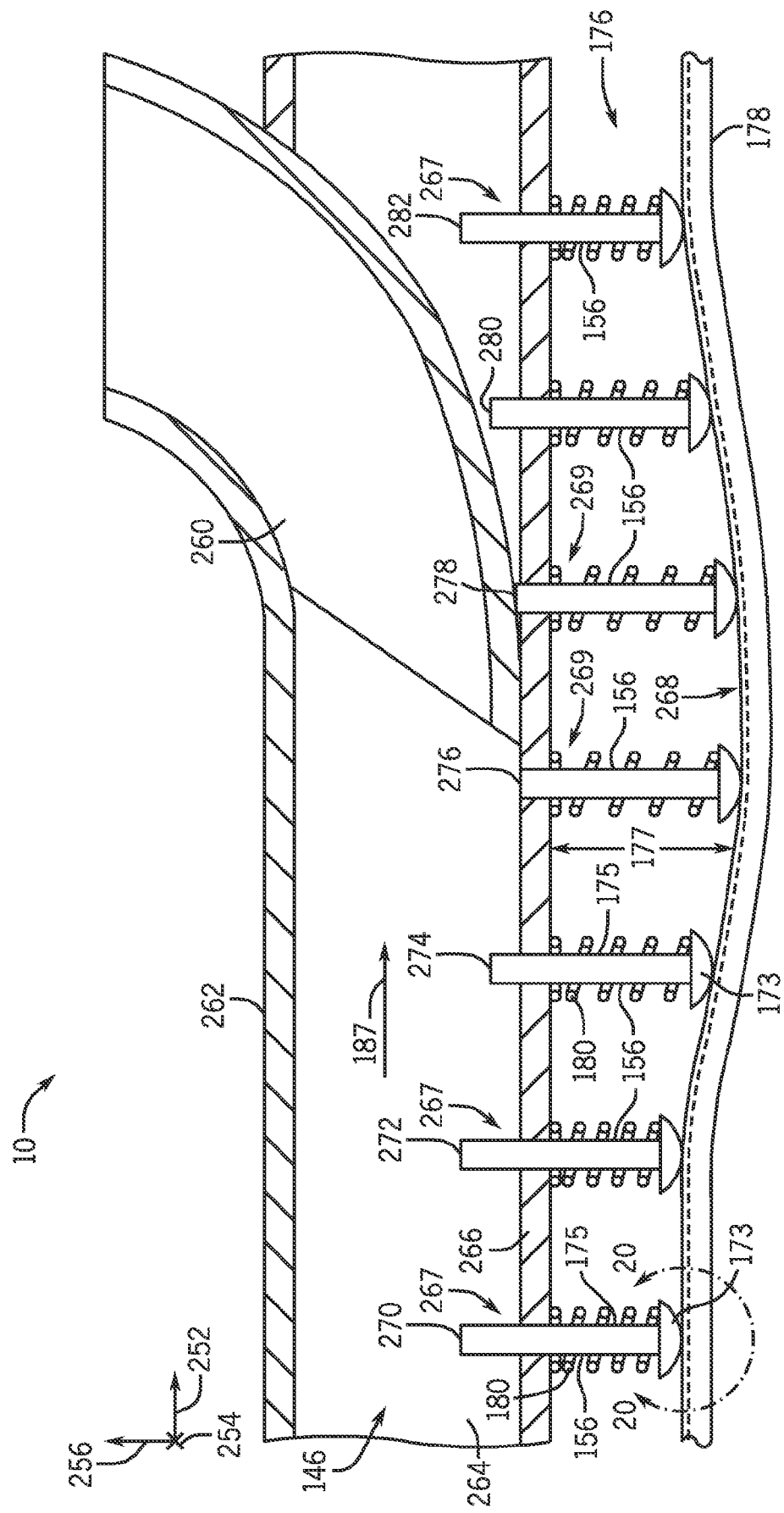
FIG. 19 is a partial schematic side view of an embodiment of the solid feed pump near a solid feed outlet, illustrating the retractable gripping elements gradually retracting and extending into the solid feed flow path.

FIG. 19 is a partial schematic side view of an embodiment of the solid feed pump 10 near a solid feed outlet 260 having gripping elements 156. As illustrated, the solid feed pump 10 includes a linear passage similar to pump 46 in FIG. 2 above but without the carriages 62 to illustrate the applicability of the system for redistributing solids to the pump 11 of FIG. 1. For purposes of discussion, reference may be made to a lengthwise direction or axis 252, a first crosswise direction or axis 254, a second crosswise direction or axis 256. In context of the pump 11 of FIG. 1, the lengthwise direction 252 is a circumferential direction that extends around the rotational axis 26, the first crosswise direction 254 is a radial direction extending away from the rotational axis 26, and the second crosswise direction 256 is an axial direction extending along (e.g., parallel to) the rotational axis 26. In context of the pump 46 of FIG. 2, the lengthwise direction 252 is a circumferential direction that extends along the closed-loop path 60, the first crosswise direction 254 is a radial direction extending away from the axis 61 of the closed-loop path 60, and the second crosswise direction 256 is an axial direction extending along (e.g., parallel to) the axis 61 of the closed-loop path 60. As illustrated, the solid feed pump 10 includes the passage 146, defined by wall portions 262, 264, and 266, and cover 262. In addition, the solid feed pump 10 includes the outlet 260, and gripping elements 156 coupled to a mechanism 176 (e.g., cam 178). As mentioned above, the passage 146 is configured to transport solid feedstock through the solid feed pump 10. The passage 146 may include the passage 12 of the solid feed pump 11 of FIG. 1 with one or more continuous passages, or the receptacle 64 of the carriage 62 of the segmented solid feed pump 46 of FIG. 2. For example, top wall portion 262 may represent the housing 14 of the solid feed pump 11 of FIG. 1 or the cover 118 of the segmented solid feed pump 46 of FIG. 2. The top wall portion 262 is not movable along the passage 146. Side wall portion 264 (e.g., opposite side wall portions) may represent discs 21 and 22 of the solid feed pump 11 of FIG. 1, or side walls 70 of each carriage 62 of the segmented solid feed pump 46 of FIG. 2. Bottom wall portion 266 may represent the hub 23 of the solid feed pump 11 of FIG. 1, or the bottom wall 66 of each carriage 62 of the segmented solid feed pump 46 of FIG. 2. The wall portions 264 and 266 are movable wall portions configured to move along the passage 146. Outlet 260 may represent the outlet 18 of the solid feed pump 11 in FIG. 1, or the outlet duct 78 of the segmented solid feed pump 46 of FIG. 2. In certain embodiments, the solid feed pump 10 may include the solid feed guide 28 of FIG. 1 disposed adjacent the outlet 260.

The solid feedstock is transported in flow direction 187 from a solid feed inlet within the passage 146 towards the outlet 260. As illustrated, a plurality of gripping elements 156 extend and retract through the wall portion 266 (e.g., movable wall portion) to selectively grip and release the solid feedstock. In certain embodiments, one or more gripping elements 156 may extend and retract through more than one wall portion 264 and 266 into the passage 146. The gripping elements 156 are configured to move crosswise to the flow direction 187 of the solid feedstock between extended and retracted positions (e.g., 267 and 269, respectively) relative to the passage 146. In the illustrated embodiment, the gripping elements 156 are configured to move between the extended and retracted positions in the second crosswise direction 256 with respect to the lengthwise direction 252 of the feedstock flow direction 187 through the solid feed pump 10.

The gripping elements 156 slide along the mechanism 176 (e.g., cam 178) via the head portions 173. The gripping elements 156 and the mechanism 176 are as described in FIG. 4. As illustrated, the cam 178 includes a groove or track 268 configured to operate with biasing elements 180 to move the gripping elements 156 between extended and retracted positions. In certain embodiments, the head portions 173 of the gripping elements 156 slide in the lengthwise direction 252 along a length of the cam 178, e.g., along the groove or track 268. The cam 178 and the wall portion 266 include the variable distance 177 between them. The variable distance 177 between the cam and the portion 266 varies to control the position of the gripping elements 156. In other words, the cam 178 and the wall portion 266 may converge or diverge relative to one another to move the gripping elements 156. For example, a shorter variable distance 177 enables the movement of the gripping elements into the extended position 267, while a longer variable distance 77 enables the movement of the gripping element into the retracted position 269. Each gripping element 156 is configured to gradually retract away from the passage 146 at least partially into the wall portion 266 (e.g., from extended positions to retracted positions) as each gripping element 156 approaches the solid feed outlet 260. In the pump 46 of FIG. 2, each gripping element 156 is configured to move or extend (e.g., gradually) from the wall portion 266 into the passage 146 after reaching the inner wall portion 104 disposed adjacent the solid feed inlet. In certain embodiments, each gripping element 156 may be configured to move or extend (e.g., gradually or controllably) from the wall portion 266 into the passage 146 (e.g., from the retracted position 269 to extended position 267) after passing the solid feed outlet 260 and prior to reaching the solid feed inlet in a solid feed pump 10 such as the pump 11 of FIG. 1.

As mentioned above, the gripping elements 156 may gradually (e.g., controllably) move between extended and retracted positions 267 and 269, respectively. For example, the gripping elements 156 (e.g., 270 and 272) located at a greater distance upstream of the solid feed outlet 260 are fully extended from the wall portion 266 into the passage 146 in extended positions 267. As the gripping elements 156 approach the solid feed outlet 260, the elements 156 (e.g., 274) begin to partially retract through the wall portion 266 away from the passage 146. Prior to reaching the solid feed outlet 260, the gripping elements 156 (e.g., 276 and 278) fully retract through the wall portion 266 away from the passage 146 in retracted positions 269. After passing the solid feed outlet 260, the gripping elements 156 gradually extend from a partially extended position (e.g., gripping element 280) to a fully extended position 267 (e.g., gripping element 282) prior to the solid feed inlet (e.g., in pump 11 of FIG. 1). In certain embodiments (e.g., pump 46 in FIG. 2), the gripping elements 156 gradually extend from a partially extend position to a fully extended position after reaching the inner wall portion 104 disposed adjacent the solid feed inlet. The ability of the gripping elements 156 to selectively grip or displace a portion of the solid feedstock facilitates the transport of the solid feedstock from the inlet to the outlet 260, while the ability of the gripping elements 156 to selectively release the portion of solid feedstock facilitates the discharge of the solid feedstock through the outlet 260. Thus, the space within the solid feedstock facilitates redistribution of the solid feedstock as the feedstock approaches and passes through the outlet 260. In particular, the gripping elements 156 selectively retract and unlock the solid feedstock near the outlet 260, thereby creating space and reducing the resistance to free the solid feedstock from the moving wall portions through the outlet 260. The redistribution of the solid feedstock prior to the outlet 260 lowers the power requirements of the pump 10. In addition, the redistribution of the solid feedstock due to the retraction of the gripping elements 156 reduces the wear and tear on components of the pump 10 (e.g., the outlet 260 or the solid feed guide 28).

Figure 20:
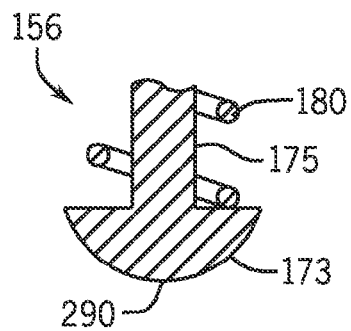
FIG. 20 is a partial schematic side view of an embodiment of a head portion (e.g., curved head portion) of the retractable gripping element, taken within line 20-20 of FIG. 19.
Figure 21:
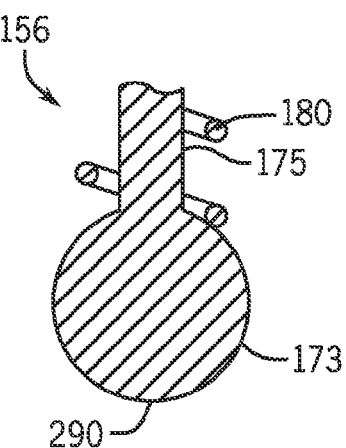
FIG. 21 is a partial schematic side view of an embodiment of the head portion (e.g., spherical head portion) of the retractable gripping element, taken within line 20-20 of FIG. 19.
Figure 22:
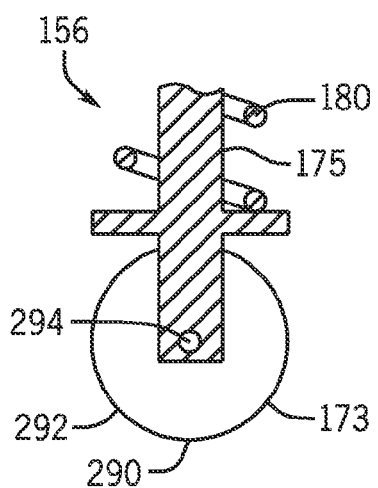
FIG. 22 is a partial schematic side view of an embodiment of the head portion (e.g., roller equipped head portion) of the retractable gripping element, taken within line 20-20 of FIG. 19.
Figure 23:
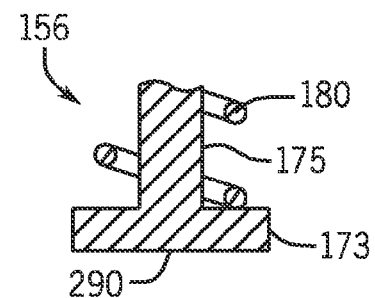
FIG. 23 is a partial schematic side view of an embodiment of the head portion (e.g., flat head portion) of the retractable gripping element, taken within line 20-20 of FIG. 19.

The shape and/or design of the head portions 173 of the gripping elements 156 interacting with the cam 178 in FIG. 19 may vary. FIGS. 20-23 are partial schematic side views of embodiments of the head portion 173 of the gripping element 156, taken within line 20-20 of FIG. 19. FIG. 20 illustrates a hemispherical end portion 173, while FIG. 21 illustrates a ball-shaped or spherical head portion 173. The interface 290 (e.g., curved, convex, or u-shaped interface) of the head portions 173 of FIGS. 20 and 21 may be configured to allow the gripping element 156 to slide with respect to the cam 178. In addition, the curved interface 290 helps when the cam 178 changes direction. As illustrated in FIG. 22, the head portion 173 includes a wheel 292 and an axle 294. The wheel 292 (and its curved interface 290) and axle 294 may be configured to enable the gripping element 156 to roll along the cam 178. The rolling of the wheel 292 may be configured to reduce friction between the head portion 173 and the cam 178. FIG. 23 illustrates a rectilinear head portion 173 with a flat interface 290. The flat interface 290 may be configured, for example with tapered edges (not shown), to enable the gripping element 156 to slide along the cam 178. In each embodiment of FIGS. 19-23, the head portion 173 generally slides along the cam 178, which is stationary relative to the passage 146. In other embodiments, the cam 178 may move with the passage 146, and thus the head portion 173 may be secured to the cam 178.

In certain embodiments, a method may include extending a plurality of gripping elements 156 into a passage 146 of a solid feed pump 10 from at least one movable wall (e.g., wall portions 150, 152, 154, 168, 196, 232, 264, and 266) moving along the passage 146 to grip or displace a portion of a solid feedstock between a solid feed inlet (e.g., inlet 16 and inlet duct 76) and a solid feed outlet (e.g., outlet 18 and outlet duct 78). The method may also include retracting the plurality of gripping elements 156 from the passage 146 into the at least one wall (e.g., wall portions 150, 152, 154, 168, 196, 232, 264, and 266) moving along the passage 146 to release the gripped portion of the solid feedstock proximate the solid feed outlet (e.g., outlet 18 and outlet duct 78). In some embodiments, retracting the plurality of gripping elements 156 includes gradually retracting each gripping element 156 as the gripping element 156 approaches the solid feed outlet (e.g., outlet 18 or outlet duct 78). In certain embodiments (e.g., pump 11 of FIG. 1), extending the plurality of the gripping elements 156 includes extending each gripping element 156 from a retracted position 267 to an extended position 269 after passing the solid feed outlet (e.g., outlet 18 and outlet duct 78) and prior to reaching the solid feed inlet (e.g., inlet 16 and inlet duct 76). In certain embodiments (e.g., pump 46 in FIG. 2), extending the plurality of the gripping elements 156 includes extending each gripping element 156 from a retracted position 267 to an extended position 269 after passing the solid feed outlet and after reaching the inner wall portion 104 disposed adjacent the solid feed inlet.

Technical effects of the disclosed embodiments include systems and methods for redistributing solids within the solid feed pump 10, particularly, as the solids approach the outlet of the solid feed pump 10. In particular, the solid feed pump 10 includes one or more gripping elements 156 (e.g., retractable gripping elements) configured to grip and release the solids within the passage 146 of the solid feed pump 10 to redistribute the solids near the outlet to facilitate discharge of the solids through the outlet of the solid feed pump 10. The one or more retractable gripping elements 156 are configured to extend from one or more movable walls (e.g., disc or hub) into the passage 146 to grip or displace a portion of the solids, and the one or more retractable gripping elements are configured to retract away from the passage 146 and through the one or more walls to release the portion of the solids. The ability of the gripping elements 156 to selectively grip or displace a portion of the solid feedstock facilitates transport of the solid feedstock from the inlet to the outlet, while the ability of the gripping elements 156 to selectively release the portion of the solid feedstock facilitates the discharge of the solid feedstock through the outlet. In particular, the gripping elements selectively retract and unlock the solid feedstock near the outlet, thereby creating space and reducing the resistance to free the solid feedstock from the moving walls through the outlet. Thus, the space within the solid feedstock facilitates redistribution of the solid feedstock as the feedstock discharges from the outlet. The redistribution of the solid feedstock prior reaching the pump outlet lowers the power requirements of the pump 10. In addition, the redistribution of the solid feedstock due to the retraction of the gripping elements reduces the wear and tear on components of the pump 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a solid feed pump configured to transport a solid feedstock, comprising:
        at least one passage for the transport of the solid feedstock;
        at least one movable wall configured to move along the passage; and
        at least one retractable gripping element configured to extend from the at least one movable wall into the at least one passage to grip a portion of the solid feedstock, and the at least one retractable gripping element is configured to retract away from the at least one passage, wherein the at least one movable wall comprises first, second, and third wall portions surrounding the at least one passage, the first and second wall portions are disposed opposite from one another, the third wall portion is disposed crosswise to the first and second wall portions, and the at least one retractable gripping element is configured to extend from the first wall portion, to extend from the second wall portion, or to extend from the third wall portion.

2. The system of claim 1, wherein the at least one retractable gripping element is configured to retract through the at least one movable wall away from the at least one passage to release the portion of the solid feedstock.

3. The system of claim 1, wherein the at least one retractable gripping element is configured to move crosswise to a flow direction of the solid feedstock between an extended position and a retracted position relative to the at least one passage.

4. The system of claim 3, wherein the at least one retractable gripping element is configured to move between the extended and retracted positions in a radial direction with respect to a rotational axis of the at least one movable wall.

5. The system of claim 3, wherein the at least one retractable gripping element is configured to move between the extended and retracted positions in a direction substantially parallel with respect to a rotational axis of the at least one movable wall.

6. The system of claim 3, wherein the at least one retractable gripping element is configured to move between the extended and retracted positions at an angle with at least one of a radial direction and a direction substantially parallel with respect to a rotational axis of the at least one movable wall.

7. The system of claim 1, comprising a solid feed inlet and a solid feed outlet coupled to the at least one passage, wherein the at least one movable wall is configured to move in a direction from the solid feed inlet to the solid feed outlet, and the retractable gripping element is configured to retract away from the at least one passage as the retractable gripping element approaches the solid feed outlet.

8. The system of claim 7, comprising a solid feed guide disposed within the at least one passage adjacent the solid feed outlet, wherein the at least one movable wall is configured to move along a sliding interface with the solid feed guide, and the retractable gripping element is configured to retract away from the at least one passage and the sliding interface prior to reaching the solid feed guide.

9. The system of claim 7, wherein the retractable gripping element is configured to move from the at least one movable wall into the at least one passage after passing the solid feed outlet and prior to reaching the solid feed inlet.

10. The system of claim 1, comprising an inner wall portion disposed within the at least one passage adjacent the solids feed inlet, wherein the at least one movable wall is configured to move past the inner wall portion, and the at least one retractable gripping element is configured to extend into the at least one passage after reaching the inner wall portion.

11. The system of claim 1, comprising a plurality of retractable gripping elements configured to move between retracted positions and extended positions relative to the at least one movable wall, and the plurality of retractable gripping elements extend into the at least one passage in the extended positions to grip the portion of the solid feedstock.

12. The system of claim 11, wherein the plurality of retractable gripping elements comprises one or more retractable gripping elements extending from the first wall portion, one or more retractable gripping elements extending from the second wall portion, one or more retractable gripping elements extending from the third wall portion, or a combination thereof.

13. The system of claim 1, wherein the solid feed pump comprises an annular-shaped wall that rotates, and the annular-shaped wall includes the at least one retractable gripping element.

14. The system of claim 1, wherein the solid feed pump comprises a segmented solid feed pump comprising a plurality of carriages coupled together sequentially about a closed-loop path, wherein each carriage of the plurality of carriages comprises at least one retractable gripping element.

15. A system, comprising:
    a solid feed pump configured to transport a solid feedstock, comprising:
        a housing;
        a rotor disposed in the housing, wherein the rotor comprises a first disc and a second disc coupled to a hub;
        a passage disposed between the housing and the hub, the first disc, and the second disc of the rotor; and
        a plurality of gripping elements configured to move between retracted positions and extended positions relative to a wall of at least one of the first disc, the second disc, or the hub, wherein the plurality of gripping elements extend into the passage in the extended positions to grip a portion of the solid feedstock, and the plurality of gripping elements retract away from the passage in the retracted positions to release the portion of the solid feedstock.

16. The system of claim 15, comprising a solid feed inlet and a solid feed outlet coupled to the passage, the rotor rotates in a rotational direction from the solid feed inlet toward the solid feed outlet, and each gripping element of the plurality of gripping elements is configured to retract into the wall away from the passage as the gripping element approaches the solid feed outlet.

17. The system of claim 16, comprising a solid feed guide disposed within the passage adjacent the solid feed outlet, wherein each gripping element of the plurality of gripping elements is configured to controllably retract from the extended position to the refracted position into the wall as each gripping element of the plurality of gripping elements approaches the solid feed guide.

18. The system of claim 16, wherein each gripping element is configured to move from the retracted position to the extended position away from the wall into the passage from the wall after passing the solid feed outlet and prior to reaching the solid feed inlet.

19. The system of claim 18, comprising an inner wall portion disposed within the passage adjacent the solid feed inlet, wherein the each gripping element of the plurality of gripping elements is configured to extend from the retracted postion to an extended position after reaching the inner wall portion.

20. A method, comprising:
controlling a solid feed pump to transport a solid feedstock through at least one passage of the solid feed pump, wherein at least one movable wall is configured to move along the passage, a retractable gripping element is configured to extend from the at least one movable wall into the at least one passage to grip a portion of the solid feedstock, and the retractable gripping element is configured to retract away from the at least one passage, and wherein the at least one movable wall comprises first, second, and third wall portions surrounding the at least one passage, the first and second wall portions are disposed opposite from one another, the third wall portion is disposed crosswise to the first and second wall portions, and the retractable gripping element is configured to extend from the first wall portion, to extend from the second wall portion, or to extend the third wall portion.

21. A system, comprising:
a solid feed pump configured to transport a solid feedstock, comprising:
at least one passage for the transport of the solid feedstock;
at least one movable wall configured to move along the passage; and
at least one retractable gripping element configured to extend from the at least one movable wall into the at least one passage to grip a portion of the solid feedstock, and the at least one retractable gripping element is configured to retract away from the at least one passage, wherein the at least one retractable gripping element is configured to move crosswise to a flow direction of the solid feedstock between an extended position and a retracted position relative to the at least one passage, and the at least one retractable gripping element is configured to move between the extended and retracted positions in a direction substantially parallel with respect to a rotational axis of the at least one movable wall.

22. A system, comprising:
a segmented solid feed pump configured to transport a solid feedstock, comprising:
at least one passage for the transport of the solid feedstock;
at least one movable wall configured to move along the passage; and
at least one retractable gripping element configured to extend from the at least one movable wall into the at least one passage to grip a portion of the solid feedstock, and the at least one retractable gripping element is configured to retract away from the at least one passage, wherein the solid feed pump comprises a segmented solid feed pump comprising a plurality of carriages coupled together sequentially about a closed-loop path, wherein each carriage of the plurality of carriages comprises at least one retractable gripping element.

* * * * *